US007236296B2

(12) United States Patent
Liu et al.

(10) Patent No.: US 7,236,296 B2
(45) Date of Patent: *Jun. 26, 2007

(54) MULTILAYER INFRARED REFLECTING FILM WITH HIGH AND SMOOTH TRANSMISSION IN VISIBLE WAVELENGTH REGION AND LAMINATE ARTICLES MADE THEREFROM

(75) Inventors: Yaoqi J. Liu, Maplewooe, MN (US); Jerry A. Sievers, Mendota Heights, MN (US); Andrew T. Ruff, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/133,513

(22) Filed: May 20, 2005

(65) Prior Publication Data

US 2005/0207002 A1 Sep. 22, 2005

Related U.S. Application Data

(63) Continuation of application No. 10/613,500, filed on Jul. 3, 2003, now Pat. No. 6,927,900, which is a continuation of application No. PCT/US02/01103, filed on Jan. 15, 2002.

(60) Provisional application No. 60/261,942, filed on Jan. 15, 2001.

(51) Int. Cl.
*G02B 5/08* (2006.01)
*G02B 1/10* (2006.01)
(52) U.S. Cl. ............... 359/359; 359/577; 359/586

(58) Field of Classification Search ........ 359/350–361, 359/577–590
See application file for complete search history.

(56) References Cited

U.S. PATENT DOCUMENTS

| 5,103,337 | A | 4/1992 | Schrenk et al. ............. 359/359 |
| 5,360,659 | A | 11/1994 | Arends et al. ............. 428/216 |
| 5,773,102 | A | 6/1998 | Rehfeld ...................... 428/34 |
| 5,882,774 | A | 3/1999 | Jonza et al. ................ 428/212 |
| 6,049,419 | A | 4/2000 | Wheatley et al. .......... 359/359 |
| 6,157,490 | A | 12/2000 | Wheatley et al. .......... 359/585 |
| 6,268,961 | B1 | 7/2001 | Nevitt et al. ................ 359/488 |
| 6,352,761 | B1 * | 3/2002 | Hebrink et al. ............. 428/212 |
| 6,498,683 | B2 | 12/2002 | Condo et al. ............... 359/589 |
| 6,783,349 | B2 | 8/2004 | Neavin et al. ............. 425/133.5 |

(Continued)

FOREIGN PATENT DOCUMENTS

WO WO 97/01440 1/1997

(Continued)

*Primary Examiner*—Thong Q Nguyen
(74) *Attorney, Agent, or Firm*—David B. Patchett

(57) ABSTRACT

A multilayer film article is disclosed. The film includes an infrared light reflecting multilayer film having alternating layers of a first polymer type and a second polymer type and an infrared light absorbing or reflecting layer adjacent the multilayer film. The film includes a multilayer stack composed of alternating optical layers of first and second diverse polymers A, B. The optical layers when counted from one end of a first effective optical packet form a plurality of unit cells each having six optical layers arranged in relative optical thicknesses in a first cyclic permutation of 7A1B1A7B1A1B. At normal incidence the first effective optical packet provides a reflection band at infrared wavelengths and substantially transmits light at visible wavelengths.

15 Claims, 29 Drawing Sheets

U.S. PATENT DOCUMENTS

| | | | | |
|---|---|---|---|---|
| 6,797,396 B1 | 9/2004 | Liu et al. | | 428/483 |
| 6,811,867 B1 | 11/2004 | McGurran et al. | | 428/333 |
| 6,927,900 B2 * | 8/2005 | Liu et al. | | 359/359 |
| 2001/0022982 A1 | 9/2001 | Neavin et al. | | 425/133.5 |

FOREIGN PATENT DOCUMENTS

| | | |
|---|---|---|
| WO | WO 98/26927 | 6/1998 |
| WO | WO 99/36810 | 7/1999 |
| WO | WO 01/96115 A1 | 12/2001 |

* cited by examiner

|   | 0 | I | II | III | IV | V | VI |
|---|---|---|---|---|---|---|---|
| 0 | RVS +0 | +1 | +2 | SYM +3 | -2 | -1 | RVS +0 |
| 1 | +1 | RVS +2 | +3 | -2 | SYM -1 | +0 | +1 |
| 2 | +2 | +3 | RVS -2 | -1 | +0 | SYM +1 | +2 |
| 3 | SYM +3 | -2 | -1 | RVS +0 | +1 | +2 | SYM +3 |
| 4 | -2 | SYM -1 | +0 | +1 | RVS +2 | +3 | -2 |
| 5 | -1 | +0 | SYM +1 | +2 | +3 | RVS -2 | -1 |
| 6 | RVS +0 | +1 | +2 | SYM +3 | -2 | -1 | RVS +0 |

$n_{PBL/SKINS} \neq n_A$ OR $n_B$

*Fig. 24a*

|   | 0 | I | II | III | IV | V | VI |
|---|---|---|---|---|---|---|---|
| 0 | -1 | +1 | +1 | SYM +3 | SYM +3 | -1 | -1 |
| 1 | -1 | +1 | +1 | SYM +3 | SYM +3 | -1 | -1 |
| 2 | SYM +1 | +3 | +3 | -1 | -1 | SYM +1 | SYM +1 |
| 3 | SYM +1 | +3 | +3 | -1 | -1 | SYM +1 | SYM +1 |
| 4 | +3 | SYM -1 | SYM -1 | +1 | +1 | +3 | +3 |
| 5 | +3 | SYM -1 | SYM -1 | +1 | +1 | +3 | +3 |
| 6 | -1 | +1 | +1 | SYM +3 | SYM +3 | -1 | -1 |

$n_A > n_{PBL/SKINS} = n_B$

*Fig. 24b*

|   | 0 | I | II | III | IV | V | VI |
|---|---|---|---|---|---|---|---|
| 0 | -1 | -1 | SYM +1 | SYM +1 | +3 | +3 | -1 |
| 1 | +1 | +1 | +3 | +3 | SYM -1 | SYM -1 | +1 |
| 2 | +1 | +1 | +3 | +3 | SYM -1 | SYM -1 | +1 |
| 3 | SYM +3 | SYM +3 | -1 | -1 | +1 | +1 | SYM +3 |
| 4 | SYM +3 | SYM +3 | -1 | -1 | +1 | +1 | SYM +3 |
| 5 | -1 | -1 | SYM +1 | SYM +1 | +3 | +3 | -1 |
| 6 | -1 | -1 | SYM +1 | SYM +1 | +3 | +3 | -1 |

$n_A = n_{PBL/SKINS} > n_B$

*Fig. 24c*

|   | 0 | I | II | III | IV | V | VI |
|---|---|---|----|-----|----|----|----|
| 0 | 6.51 | 5.86 | 5.72 | 6.30 | 6.80 | 6.43 | 6.05 |
| 1 | 6.98 | 6.26 | 6.13 | 6.80 | 7.21 | 6.97 | 6.49 |
| 2 | 6.67 | 6.07 | 5.91 | 6.43 | 6.97 | 6.82 | 6.16 |
| 3 | 6.26 | 5.66 | 5.51 | 6.05 | 6.49 | 6.16 | 5.84 |
| 4 | 5.66 | 5.37 | 5.26 | 5.45 | 6.77 | 5.62 | 5.24 |
| 5 | 5.51 | 5.26 | 5.15 | 5.31 | 5.71 | 5.48 | 5.10 |
| 6 | 6.05 | 5.45 | 5.31 | 5.85 | 6.28 | 5.96 | 5.67 |

$n_{SKIN/PBL}=1.0$

*Fig. 25a*

|   | 0 | I | II | III | IV | V | VI |
|---|---|---|---|---|---|---|---|
| 0 | 7.18 | 6.25 | 7.35 | 9.03 | 9.25 | 8.09 | 6.96 |
| 1 | 8.25 | 6.95 | 7.42 | 9.25 | 9.46 | 8.89 | 7.90 |
| 2 | 8.60 | 7.18 | 6.67 | 8.09 | 8.89 | 9.71 | 9.02 |
| 3 | 8.62 | 6.82 | 6.14 | 6.96 | 7.90 | 9.02 | 8.76 |
| 4 | 6.82 | 5.45 | 4.90 | 6.16 | 6.91 | 7.54 | 7.11 |
| 5 | 6.14 | 4.90 | 5.49 | 7.04 | 7.46 | 6.79 | 6.08 |
| 6 | 6.96 | 6.16 | 7.04 | 8.67 | 8.92 | 7.82 | 6.79 |

$n_{SKIN/PBL} = 1.425$

*Fig. 25b*

|   | 0 | I | II | III | IV | V | VI |
|---|---|---|----|-----|----|----|----|
| 0 | 4.48 | 3.67 | 5.59 | 7.04 | 6.78 | 5.39 | 4.29 |
| 1 | 5.66 | 4.34 | 5.22 | 6.78 | 7.18 | 6.32 | 5.48 |
| 2 | 7.40 | 5.69 | 4.17 | 5.39 | 6.32 | 7.21 | 7.25 |
| 3 | 7.39 | 5.88 | 3.54 | 4.29 | 5.48 | 7.25 | 7.54 |
| 4 | 5.88 | 4.31 | 2.17 | 3.55 | 4.11 | 5.53 | 5.90 |
| 5 | 3.54 | 2.17 | 4.42 | 5.94 | 5.33 | 3.99 | 3.45 |
| 6 | 4.29 | 3.55 | 5.94 | 7.28 | 7.11 | 5.55 | 4.20 |

$n_{SKIN/PBL} = 1.5$

*Fig. 25c*

|   | 0 | I | II | III | IV | V | VI |
|---|---|---|----|-----|----|---|----|
| 0 | 3.02 | 2.68 | 5.75 | 7.13 | 6.28 | 4.07 | 2.78 |
| 1 | 4.25 | 2.70 | 4.75 | 6.28 | 6.26 | 4.87 | 3.96 |
| 2 | 6.37 | 4.72 | 2.61 | 4.07 | 4.87 | 6.00 | 6.07 |
| 3 | 7.08 | 5.54 | 2.59 | 2.78 | 3.96 | 6.07 | 6.45 |
| 4 | 5.54 | 4.39 | 1.86 | 2.52 | 2.62 | 4.46 | 5.29 |
| 5 | 2.59 | 1.86 | 4.28 | 5.48 | 4.82 | 2.56 | 2.46 |
| 6 | 2.78 | 2.52 | 5.48 | 7.02 | 6.50 | 4.09 | 2.73 |

$n_{SKIN/PBL} = 1.5375$

Fig. 25d

|   | 0 | I | II | III | IV | V | VI |
|---|---|---|----|-----|----|----|-----|
| 0 | 1.48 | 3.23 | 5.68 | 6.60 | 5.70 | 2.87 | 1.46 |
| 1 | 3.07 | 1.37 | 4.24 | 5.70 | 5.32 | 3.32 | 2.93 |
| 2 | 6.05 | 4.54 | 1.28 | 2.87 | 3.32 | 5.16 | 5.97 |
| 3 | 6.95 | 5.55 | 2.97 | 1.46 | 2.93 | 5.97 | 6.80 |
| 4 | 5.55 | 5.26 | 3.74 | 2.97 | 1.28 | 4.37 | 5.92 |
| 5 | 2.97 | 3.74 | 5.53 | 5.81 | 4.29 | 1.18 | 2.99 |
| 6 | 1.46 | 2.97 | 5.81 | 6.82 | 5.50 | 2.81 | 1.26 |

$n_{SKIN/PBL} = 1.575$

*Fig. 25e*

|   | 0 | I | II | III | IV | V | VI |
|---|---|---|----|-----|----|----|-----|
| 0 | 3.18 | 4.56 | 6.76 | 7.24 | 5.72 | 2.80 | 3.03 |
| 1 | 2.86 | 3.07 | 4.94 | 5.72 | 4.83 | 1.88 | 2.86 |
| 2 | 5.85 | 5.23 | 2.90 | 2.80 | 1.88 | 4.93 | 6.08 |
| 3 | 7.39 | 7.06 | 4.45 | 3.03 | 2.86 | 6.08 | 7.70 |
| 4 | 7.06 | 7.20 | 5.24 | 4.43 | 2.87 | 5.23 | 6.84 |
| 5 | 4.45 | 5.24 | 6.34 | 6.80 | 5.01 | 2.75 | 4.34 |
| 6 | 3.03 | 4.43 | 6.80 | 7.45 | 6.03 | 2.73 | 2.90 |

$n_{SKIN/PBL} = 1.6125$

*Fig. 25f*

|   | 0 | I | II | III | IV | V | VI |
|---|---|---|---|---|---|---|---|
| 0 | 5.07 | 6.36 | 8.41 | 8.31 | 6.49 | 4.10 | 4.75 |
| 1 | 4.16 | 4.88 | 6.53 | 6.49 | 4.80 | 2.50 | 4.06 |
| 2 | 6.08 | 6.04 | 4.67 | 4.10 | 2.50 | 4.81 | 6.54 |
| 3 | 8.02 | 7.77 | 6.19 | 4.75 | 4.06 | 6.54 | 8.30 |
| 4 | 7.77 | 8.29 | 7.11 | 6.22 | 4.69 | 6.03 | 8.10 |
| 5 | 6.19 | 7.11 | 8.13 | 7.77 | 5.82 | 4.57 | 6.18 |
| 6 | 4.75 | 6.22 | 7.77 | 8.16 | 6.33 | 3.94 | 4.70 |

$n_{SKIN/PBL} = 1.65$

*Fig. 25g*

|   | 0 | I | II | III | IV | V | VI |
|---|---|---|---|---|---|---|---|
| 0 | 8.78 | 10.29 | 10.84 | 10.70 | 8.68 | 7.44 | 8.51 |
| 1 | 7.61 | 8.49 | 9.00 | 8.68 | 6.70 | 6.12 | 7.40 |
| 2 | 8.87 | 9.53 | 8.31 | 7.44 | 6.12 | 6.67 | 8.75 |
| 3 | 10.85 | 11.25 | 9.81 | 8.51 | 7.40 | 8.75 | 10.84 |
| 4 | 11.25 | 12.19 | 10.93 | 9.72 | 8.35 | 8.95 | 11.07 |
| 5 | 9.81 | 10.93 | 11.85 | 11.07 | 9.25 | 8.29 | 9.90 |
| 6 | 8.51 | 9.72 | 11.07 | 10.80 | 8.73 | 7.24 | 8.39 |

$n_{SKIN/PBL} = 1.725$

*Fig. 25h*

MULTILAYER INFRARED REFLECTING FILM WITH HIGH AND SMOOTH TRANSMISSION IN VISIBLE WAVELENGTH REGION AND LAMINATE ARTICLES MADE THEREFROM

CROSS REFERENCE TO RELATED APPLICATIONS

This application is a continuation of application Ser. No. 10/613,500, filed Jul. 3, 2003, now U.S. Pat. No. 6,927,900, which is a continuation of PCT International Application No. PCT/US02/01103, filed Jan. 15, 2002, which claims priority to U.S. Provisional Application Ser. No. 60/261,942, filed Jan. 15, 2001, now expired.

TECHNICAL FIELD

This invention relates to dielectric multilayer reflecting films (including coatings applied to substrates) and laminate articles made therefrom.

BACKGROUND

A conventional automotive safety glazing is formed from a laminate made of two rigid layers, typically glass, and an anti-lacerative mechanical energy absorbing interlayer of plasticized polyvinyl butyral (PVB). The glazing is prepared by placing the PVB layer between glass sheets, eliminating air from the engaging surfaces, and then subjecting the assembly to elevated temperature and pressure in an autoclave to fusion bond the PVB and glass into an optically clear structure. The glazing may then be used in the windows, including those in the front (windshield), the rear, and the side glass of a motor vehicle.

The laminate may also include at least one functional layer engineered to enhance the performance of the vehicle window. One important functional layer reduces entry of infrared radiation into the vehicle cabin. When used in a windshield, the composite laminate structure should transmit at least about 70% of the light in the wavelength region sensitive to the human eye, typically from about 400 to about 700 nanometers (nm), and reject solar radiation outside the visible portion of the spectrum. When used in other glazing structures, such as side or rear windows, there are typically no limits on the level of visible transmission.

The functional layer in the laminate may be a birefringent, non-metallic film made from alternating layers of dielectric materials, preferably polymers with differing indices of refraction. These birefringent films may be engineered to reflect or absorb a desired amount of light in a spectral region of interest (such as the infrared region) while transmitting sufficient visible light in the visible region of the spectrum to be substantially transparent.

The reflectance characteristics of the multilayer film are determined in part by the indices of refraction for the layered structure. In particular, reflectivity depends upon the relationship between the indices of refraction of each material in the x, y, and z directions ($n_x$, $n_y$, $n_z$). The film is preferably constructed using at least one uniaxially birefringent material, in which two indices (typically along the x and y axes, or $n_x$ and $n_y$) are approximately equal, and different from the third index (typically along the z axis, or $n_z$). The x and y axes are defined as the in-plane axes, in that they lie in the plane within the multilayer film, and the respective indices $n_x$ and $n_y$ are referred to as the in-plane indices. If $n_{1z}$ is selected to match $n_{2x}=n_{2y}=n_{2z}$ and the multilayer film is biaxially oriented, there is no Brewster's angle for p-polarized light and each interface exhibits constant reflectivity for p-polarized light for all angles of incidence.

A second factor that influences the reflectance characteristics of the multilayer film is the thickness of the layers in the film stack. The individual layers are arranged in groups of two or more that repeat throughout the stack, referred to as optical repeat units or unit cells, each of which has a total optical thickness that is ½ of the wavelength of light to be reflected. All thicknesses discussed herein are measured after any orientation or other processing, unless otherwise noted. The term optical thickness refers to the physical thickness multiplied by the refractive index, which may be a function of polarization (for birefringent materials) and wavelength (for dispersive materials).

The infrared (IR) reflecting films described in U.S. Pat. No. 5,882,774 (Jonza et al.) and U.S. Pat. No. 6,049,419 (Wheatley et al.) control the amount of solar energy that pass through them, preferably without significantly decreasing the intensity or changing the color of light sensed by the human eye at any angle. The materials in the layers, the thicknesses of the layers, and the indices of refraction of the layers are selected to reflect infrared radiation within the wavelength range of about 700 nm to about 2000 nm, while transmitting visible light. The film has an average reflectivity of at least 50% over a band at least 100 nm wide in the infrared region of the spectrum.

In one design, the IR reflecting film may include a multilayer stack of unit cells composed of alternating layers of first (A) and second (B) polymers, usually with similar optical thicknesses, referred to herein as an AB construction.

In an alternative design, the IR reflecting film described in U.S. Pat. No. 5,360,659 (Arends et al.) may also have multilayer stack of unit cells composed of alternating layers of first (A) and second (B) polymers. In this construction the unit cells have six layers with relative optical thicknesses of about .778A.111B.111A.778B.111A.111B. This construction, referred to herein as the 711 construction, suppresses unwanted second, third, and fourth order reflections in the visible wavelength region of between about 400 to about 700 nm, while reflecting light in the infrared wavelength region of between about 700 to about 2000 nm. Reflections higher than fourth order will generally be in the ultraviolet, not visible, region of the spectrum or will be of such a low intensity as to be unobjectionable.

Reference is also made to U.S. application Ser. No. 09/590,924 (Liu et al.), now U.S. Pat. No. 6,797,396, priority document to PCT Publication No. WO 01/96104, which discusses multilayer optical films useful in laminating to substrates having a compound curvature, such as motor vehicle windshields.

To reflect over a wide band, the unit cells in either of the film designs described above preferably have varying optical thicknesses, referred to herein as a layer thickness gradient, which are selected to achieve the desired bandwidth of reflection. The layer thickness gradient may vary widely depending on the intended application for the film. For example, the layer thickness gradient may be linear, in which the optical thickness of the unit cells (and each of their component layers) increases at a constant rate across the thickness of the film. In this construction, each unit cell is a certain amount thicker than the thickness of the previous unit cell in the multilayer stack. The layer thickness may decrease, then increase, then decrease again from one major surface of the film to the other, or may have an alternate layer thickness distribution designed to increase the sharpness of one or both bandedges, as described in U.S. Pat. No. 6,157,490 (Wheatley et al.).

The multilayer IR reflecting film designs described above have very high visible light transmission, and are useful as IR mirrors or IR polarizers in automotive glazing laminates. When used in a windshield laminate construction, these IR mirrors and polarizers have low reflection in the visible region (referred to as veiling glare in the automotive arts), which enhances performance. However, the IR mirrors and polarizers may also generate unwanted colors (iridescence) in certain laminate constructions, which may be unacceptable in demanding automotive and architectural applications.

SUMMARY

The unwanted colors created by the multilayer polymeric IR reflecting film designs described above result from noise (i.e., unwanted variation or modulation) in the visible portion of the transmission spectrum, as well as the reflection spectrum, of the film. The present application teaches multilayer constructions for polymeric IR reflecting films that can reduce or substantially eliminate noise in the visible region (about 400 to about 700 nm) of the film's transmission spectrum, while maintaining an average reflectivity of at least 50% over a band at least 100 nm wide in the infrared region of the spectrum. This reduction in noise reduces unwanted coloration in the film, and improves the appearance of laminate constructions in which the film is used, such as automotive or architectural windows (such as for office buildings, residences, greenhouses, etc.). The laminate constructions can include articles in which the film is sandwiched between two glazing materials, including glass and plastics, such as polycarbonate and PMMA, and also articles in which the film is simply applied to one such substrate.

The present application teaches optical bodies that have at least a first effective optical packet of contiguous optical layers bounded by non-optical layers, the optical layers composed of alternating diverse materials A, B. The optical layers of an optical body when counted from one end of the first effective optical packet form a plurality of unit cells each having six optical layers arranged in relative optical thicknesses in a first cyclic permutation of 7A1B1A7B1A1B that provides a better optical figure of merit than does a second optical body identical to the first-mentioned optical body except for having a second effective optical packet substituted for the first effective optical packet, the second effective optical packet having optical layers arranged in a second cyclic permutation of 7A1B1A7B1A1B different from the first cyclic permutation.

The present application teaches articles comprising at least a first effective optical packet having unit cells that consist essentially of a sequence of six optical layers. A first optical layer disposed at a first end of the first effective optical packet is selected from among the sequence of six optical layers in order to enhance an optical figure of merit, such as an amount of spectral noise in the visible region. A second optical layer disposed at a second end of the first effective optical packet is also selected from among the sequence of six optical layers to enhance the optical figure of merit. The six optical layers can be of the 7-1-1-7-1-1 type, which includes cyclic permutations thereof.

The present application teaches methods of controlling noise in a spectral region of interest in an optical body that includes a multilayer optical film. The multilayer optical film has at least a first effective optical packet of optical layers arranged in unit cells, such unit cells being composed of more than two such optical layers. The methods include the step of selecting a first optical layer disposed at a first end of the first effective optical packet from among the more than two optical layers in the unit cells so as to enhance an optical figure of merit.

The details of one or more embodiments are set forth in the accompanying drawings and the description below. Other features, objects, and advantages will be apparent from the description and drawings, and from the claims.

DESCRIPTION OF DRAWINGS

FIG. 24a is a matrix showing symmetry properties (if any) and deviations (if any) from an integer number of unit cells of effective optical packets for each of the forty-nine layer configurations for cases where: (i) no skin/PBL layers are present and the optical packet is immersed in air or vacuum; or (ii) skin/PBL layers are present but have a refractive index different from the refractive index of both materials used in the optical layers of the optical packet.

FIG. 24b is a matrix showing symmetry properties (if any) and deviations (if any) from an integer number of unit cells of effective optical packets resulting from the combination of the forty-nine layer configurations and non-optical layers on both sides thereof, where the non-optical layers have the same refractive index as the low index optical layer of the optical packet.

FIG. 24c is a matrix showing symmetry properties (if any) and deviations (if any) from an integer number of unit cells of effective optical packets resulting from the combination of the forty-nine layer configurations and non-optical layers on both sides thereof, where the non-optical layers have the same refractive index as the high index optical layer of the optical packet.

FIG. 25a is a matrix showing noise in the spectral region from 400 to 600 nm calculated for the case where the non-optical layers on both sides of the optical packet are air, for each of the layer configurations of FIG. 23.

FIG. 25b is a matrix showing noise in the spectral region from 400 to 600 nm calculated for the case where non-optical skin/PBL layers on both sides of the optical packet are provided having a refractive index (1.425) below both the high and low index optical layers, for each of the layer configurations in FIG. 23.

FIG. 25c is a matrix showing noise in the spectral region from 400 to 600 nm calculated for the case where non-optical skin/PBL layers on both sides of the optical packet are provided having a refractive index (1.5) substantially equal to that of the low index optical layers, for each of the layer configurations in FIG. 23.

FIG. 25d is a matrix showing noise in the spectral region from 400 to 600 nm calculated for the case where non-optical skin/PBL layers on both sides of the optical packet are provided having a refractive index (1.5375) between that of the low and high index optical layers, for each of the layer configurations in FIG. 23.

FIG. 25e is a matrix showing noise in the spectral region from 400 to 600 nm calculated for the case where non-optical skin/PBL layers on both sides of the optical packet are provided having a refractive index (1.575) between that of the low and high index optical layers, for each of the layer configurations in FIG. 23.

FIG. 25f is a matrix showing noise in the spectral region from 400 to 600 nm calculated for the case where non-optical skin/PBL layers on both sides of the optical packet are provided having a refractive index (1.6125) between that of the low and high index optical layers, for each of the layer configurations in FIG. 23.

FIG. 25g is a matrix showing noise in the spectral region from 400 to 600 nm calculated for the case where non-optical skin/PBL layers on both sides of the optical packet are provided having a refractive index (1.65) substantially equal to that of the high index optical layers, for each of the layer configurations in FIG. 23.

FIG. 25h is a matrix showing noise in the spectral region from 400 to 600 nm calculated for the case where non-optical skin/PBL layers on both sides of the optical packet are provided having a refractive index (1.725) greater than both the high and low index optical layers, for each of the layer configurations in FIG. 23.

Like reference symbols in the various drawings indicate like elements. Figures that depict unit cells of a film show only a few unit cells for ease of description.

DETAILED DESCRIPTION

Figure 1:
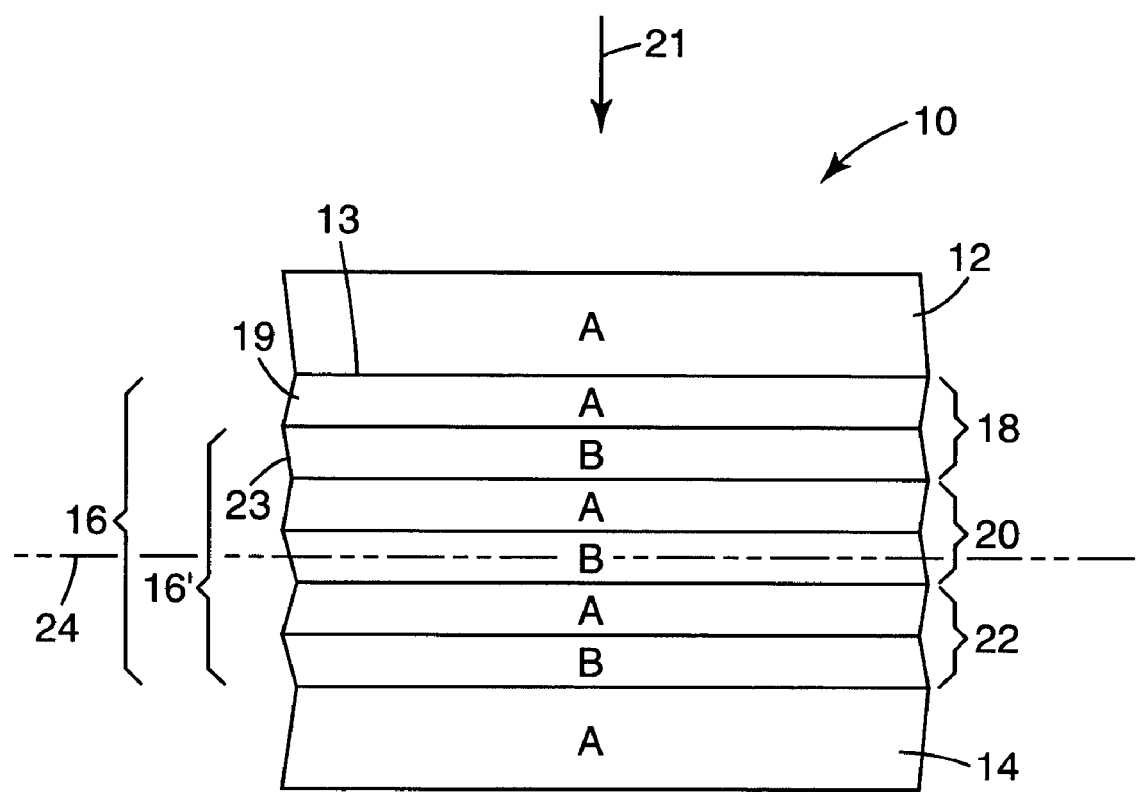
FIG. 1 is a cross sectional view of an illustrative quarter wave layer construction for use in a multilayer IR reflecting film.

Disclosed herein are multilayer dielectric optical films composed of an optical stack made of unit cells, the unit cells each comprising at least a layer of a first material (A) and a layer of a second material (B), the materials preferably being polymers. The polymer A has a first in-plane index of refraction and the polymer B has a second in-plane index of refraction that is different from the first index of refraction. This film is highly reflective for both s and p polarized light for a wide range of incident directions. The film has an average reflectivity of at least 50%, preferably at least 70%, over at least a 100 nm wide band in a wavelength region of interest. The wavelength region of interest may vary widely depending on the intended application.

The optical stack includes one or more optical packets, where an "optical packet" refers to a contiguous arrangement of unit cells of like design, which arrangement of unit cells may or may not have a layer thickness gradient as described below. In some cases, optically thick protective boundary layers can be used at one or both boundaries of the optical packets.

In one embodiment, the wavelength region of interest is the infrared region, and the film is engineered to reflect incident radiation in the infrared region. The arrangement of unit cells and the optical thicknesses of the layers in the unit cells are selected to reflect infrared radiation within the wavelength range of about 700 nm to about 2000 nm, while transmitting visible light. The film has an average reflectivity of at least 50%, preferably at least 70%, over a band at least 100 nm wide in the infrared portion of the spectrum, within the range of about 700 nm to about 2000 nm. The IR reflecting film includes polymer layers and optically thick protective boundary layers arranged to reduce or substantially eliminate the noise, referred to in the art as high frequency or side band ripple, in the visible region (about 400 to about 700 nm) of the film's transmission spectrum. This noise reduction, which reduces unwanted coloration in the film, is achieved while maintaining high average reflectivity in the infrared region of the spectrum.

In one multilayer construction, referred to above as an AB construction, each unit cell has only two individual polymer layers, and the layers are preferably of substantially equal optical thickness. Preferably, the unit cells have optical thicknesses ranging from 350 to 600 nm (½ the wavelength of the light desired to be reflected), more preferably from 425 to 600 nm, to reflect light in the near infrared, and the individual layers form a quarter wave packet. Thus, the individual layers making up the unit cells have optical thicknesses ranging from about 175 to 300 nm (¼ the wavelength of the light desired to be reflected), preferably from about 212 to 300 nm, to reflect light in the near infrared portion of the spectrum.

In another multilayer construction, each unit cell in the optical packet(s) includes at least a first, second, and third diverse, substantially transparent material A, B, and C, as described in U.S. Pat. No. 5,103,337 (Schrenk et al.) and PCT Publication No. WO99/36810. The materials are selected such that the refractive indices have the relationship $n_A>n_B>n_C$, and such that $n_B$ is the square root of the product of $n_A$ and $n_C$. Each unit cell has four optical layers arranged as ABCB, where the relative optical thicknesses of the layers are ⅓, ⅙, ⅓, ⅙ respectively, alternatively expressed herein as 2A1B2C1B. This construction suppresses second, third, and fourth order reflections.

In still another multilayer construction, the unit cells in the optical packet(s) each have six layers with relative layer thicknesses of about 7A1B1A7B1A1B. This construction, referred to herein as the 711 construction, suppresses the unwanted second, third, and fourth order reflections in the visible wavelength region from about 400 to about 700 mm, while reflecting light in the infrared wavelength region from about 700 to about 2000 nm, preferably from about 850 to about 2000 nm. Reflections higher than fourth order will generally be in the ultraviolet, not visible, region of the spectrum or will be of such a low intensity as to be unobjectionable.

In yet another construction, a hybrid design combines a first portion of unit cells of one design (such as the 711 construction) with a second portion of unit cells of another design (such as the AB construction). The layer thicknesses of both the first and second portions can be adjusted to place the reflecting band within the infrared spectrum so as to minimize any perceived color change with angle.

To reflect over a wide band, the layers in any of the film designs described above are preferably arranged to have a gradient optical thickness, referred to herein as a layer thickness gradient, selected to achieve the desired bandwidth of reflection. The layer thickness gradient may vary widely to provide a film with specific optical performance for a particular application. For example, the layer thickness gradient may be linear, wherein the thickness of the layers (and the corresponding unit cells) increases at a constant rate across the thickness of the film. Alternatively, each unit cell is a certain percentage thicker than the thickness of the previous unit cell. The unit cell thickness may decrease, then increase, then decrease again from one major surface of the film to the other, or may have an alternate layer thickness distribution designed to increase the sharpness of one or both bandedges, as described in U.S. Pat. No. 6,157,490 (Wheatley et al.).

In addition to the first and second optical layers, the multilayer reflective films described herein preferably include one or more non-optical layers. Non-optical layer is used herein to refer to an optically thick layer. An optically thick layer refers to a layer whose optical thickness is at least about ten wavelengths of light in the spectral region of interest. For example, one or more skin layers may be applied on the exterior surfaces of the film construction, or one or more interior non-optical layers, such as protective boundary layers, may be inserted between packets of layers that form the unit cells. Non-optical layers give the multilayer film structure or protect it from harm or damage during or after processing. Typically, one or more of the non-optical layers are placed so that at least a portion of the light to be transmitted, polarized, or reflected by the individual layers making up the unit cells also travels through the non-optical layers (i.e., these layers are placed in the path of light which travels through or is reflected by the first and second optical layers). The non-optical layers may be of any appropriate material and can be the same as one of the materials used in the optical stack. For purposes of setting limits or bounds on an optical packet or effective optical packet, an optically thick or even semi-infinite layer of air or vacuum can also be considered a non-optical layer.

The present application teaches that two multilayer optical films having nominally the same type of unit cell structure (i.e., the same number of optical layers and relative optical thicknesses thereof), nominally the same number of unit cells, and nominally the same thickness gradient, if any, of the unit cells through the thickness of the stack can have significantly different optical performance, for example significantly different amounts of spectral noise in the visible region for films designed to reflect in the infrared region. The difference between the films that permits one to achieve the more desirable level of optical performance (e.g., lower visible noise) can be: (a) a different cyclic permutation of the optical layers within the unit cells such that different optical layers are present at one or both boundaries of the effective optical packet; (b) the addition of a small number of optical layers at one or both boundaries of the effective optical packet; and/or (c) a different refractive index for non-optical layers which bound the effective optical packet. These differences often translate into differences in the symmetry properties of the effective optical packets under comparison, which have been found to be significant under certain conditions.

An exemplary IR reflecting film with a noise reducing AB layer construction is shown in FIG. 1. The film 10 includes a first non-optical boundary layer 12 of polymer A and a second non-optical boundary layer 14 of polymer A bounding an optical packet 16. For simplicity, the film is shown to have only three unit cells, but in practice would have many more unit cells. The optical packet 16 is a contiguous arrangement of alternating optical layers, bounded by non-optical layers, that define an integer number (3) of unit cells 18, 20, and 22, each having one layer of polymer A and one layer of polymer B of substantially equal quarter wave optical thickness. Since the boundary layer 12 is made of the same polymer as the first layer 19 in the unit cell 18, from the perspective of a light ray 21 entering the film the interface 13 between the boundary layer 12 and the optical layer 19 effectively disappears. This effective merging of the boundary layer and the first layer 19 forms a construction that differs from an integer number (3) of unit cells by one optical layer, which condition is referred to herein as a "near integer" number of unit cells. The merging of the boundary layer 12 and the layer 19 results in an "effective optical packet" 16' consisting essentially of 2n−1 optical layers, where n is the number of unit cells in the effective packet if one additional optical layer were added. The effective optical packet 16' in FIG. 1 includes B layer 23, as well as the layers in unit cells 20, 22, for a total of 2(3)−1=5 layers. Of course, one could alternatively entirely omit layer 19 from the film altogether. In that case the original optical packet 16 and the effective optical packet are identical, each consisting essentially of 2n−1 optical layers. The same can be said for the embodiments discussed below including those depicted in FIG. 2 (where layer 62 can be omitted), FIG. 5 (where layer 212 can be omitted), FIG. 6 (where layer 255 can be omitted), and FIG. 10 (were the outer 1B layer and/or the outer 1A layer can be omitted depending on the properties of the $B_1$ and $B_2$ boundary layers).

The merging of the boundary layer 12 with the optical layer 19 also maintains symmetry in the effective optical packet with respect to the polymer material (A or B) and optical thickness arrangement of the optical layers on either side of a plane 24. The plane 24 bisects one of the B layers in the optical packet, as shown. The material and thickness arrangements of the optical layers exhibit mirror symmetry with respect to the plane 24. Note that the layers shown in FIG. 1, and in subsequent figures depicting sectional views of multilayer films, the layer thicknesses are not necessarily drawn to scale. For example, the non-optical boundary layers 12, 14 of film 10 will have a much greater optical thickness when drawn to scale than the optical thicknesses of the individual layers in optical packet 16.

If the layers in the effective optical packet are not the same thickness, but have a layer thickness gradient in a direction normal to the plane 24, the optical packet is still said to maintain a pseudo-symmetry on either side of the plane 24. Pseudo-symmetry as used herein means that there is a mirror symmetry in the arrangement of polymer materials of the optical layers, and but for the layer thickness gradient there would also be mirror symmetry in the optical thickness arrangement of the optical layers.

Figure 2:
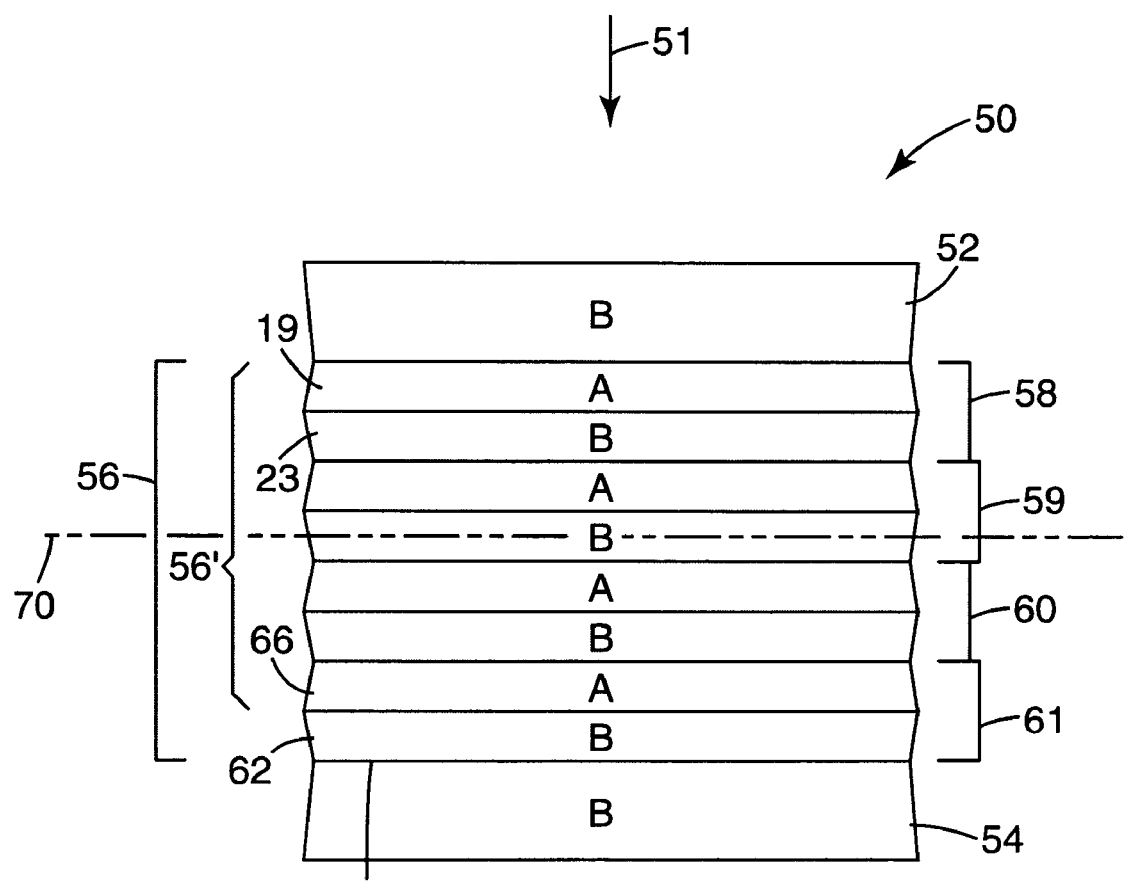
FIG. 2 is a cross sectional view of another quarter wave layer construction for use in a multilayer IR reflecting film.

FIG. 2 shows another IR reflecting film with a noise reducing AB layer construction. The film 50 includes a first boundary layer 52 of polymer B and a second boundary layer 54 of polymer B bounding an optically active multilayer packet 56. The optical packet 56 is an optical stack and has an integer number (4) of unit cells 58, 59, 60, 61, each with a layer of polymer A and a layer of polymer B of substantially equal quarter wave optical thickness. Since the boundary layer 54 is made of the same polymer as the last layer 62 in the unit cell 61, from the perspective of a light ray 51 entering the film the interface 64 between the boundary layer 54 and the layer 62 effectively disappears. This effective merging of the boundary layer and the last layer 62 forms a construction that has a near integer number of unit cells. The merging of the boundary layer 54 and the layer 62 results in an effective optical packet 56' consisting essentially of 2(4)−1=7 layers. The effective optical packet 56' in FIG. 2 consists essentially of A layer 66 and the layers in unit cells 58, 59, and 60.

The merging of the boundary layer 54 with the optical layer 62 also maintains symmetry in the optical packet with respect to polymer material and thickness arrangement on either side of a plane 70 within the packet, which bisects one of the B layers.

Figure 3:
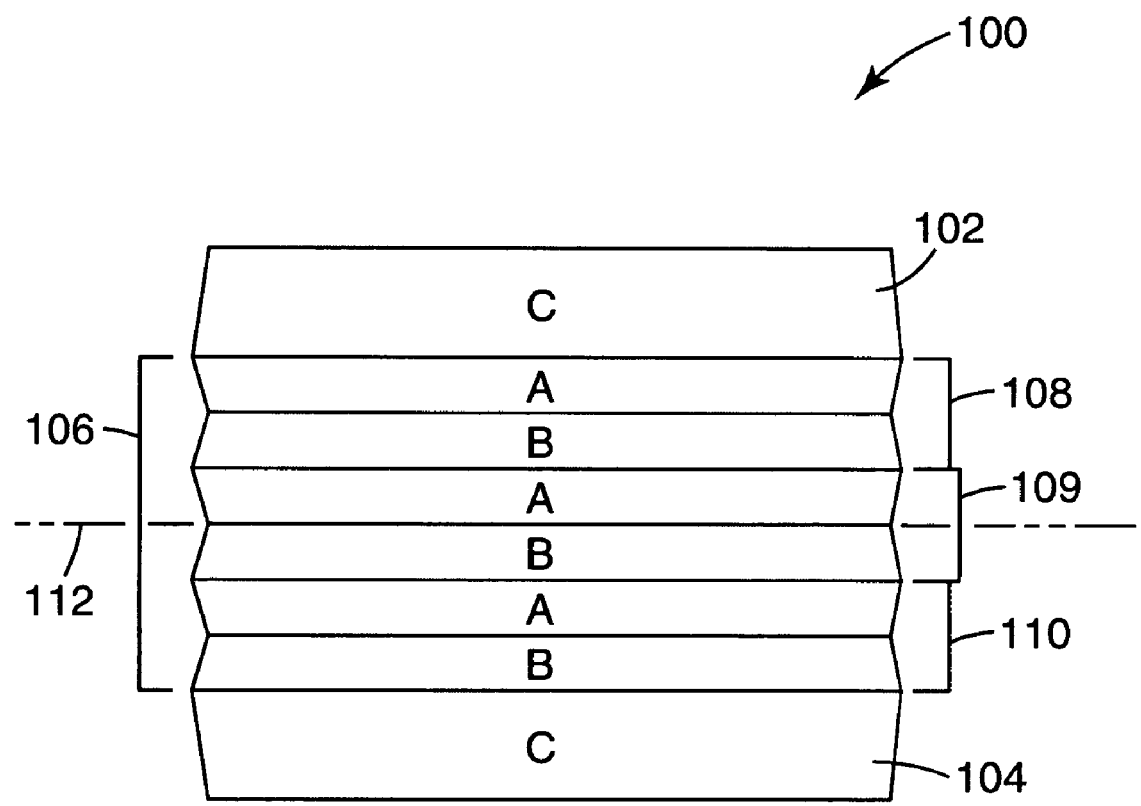
FIG. 3 is a cross sectional view of another quarter wave layer construction for use in a multilayer IR reflecting film.

FIG. 3 shows another IR reflecting film 100 including a first boundary layer 102 of polymer C and a second boundary layer 104 of polymer C bounding an optical packet 106. The optical packet 106 has an integer number (3) of unit cells 108, 109, 110, each having one layer of polymer A and one layer of polymer B of substantially equal quarter wave optical thickness. Since the boundary layers 102, 104 are made of a different polymer than the polymers in the optical packet 106 (where each polymer has a unique refractive index), there is no effective merging of the boundary layers into the layers of the packet 106, and the optical packet 106 and its corresponding effective optical packet are identical. While the optical packet 106 consists essentially of an integer number of unit cells (3), there is no symmetry of layer arrangement about a plane within the packet 106. However, the optical packet 106 does exhibit reverse symmetry of layer arrangement and layer thickness about a plane 112 in the optical packet 106, and for this reason the optical packet will have reduced noise in the visible region of the spectrum compared to other layer arrangements. Reverse symmetry about a given plane means that the refractive index changes in opposite ways on opposed sides of the given plane as a function of optical distance from such plane along an axis perpendicular to such plane (or along an oblique axis if obliquely incident light is under evaluation). This is in distinction to regular (mirror) symmetry, where the refractive index changes in the same way on opposed sides of the given plane as a function of optical distance from such plane. If outer layer A or B is omitted, then the effective optical packet exhibits symmetry (mirror symmetry).

Figure 4:
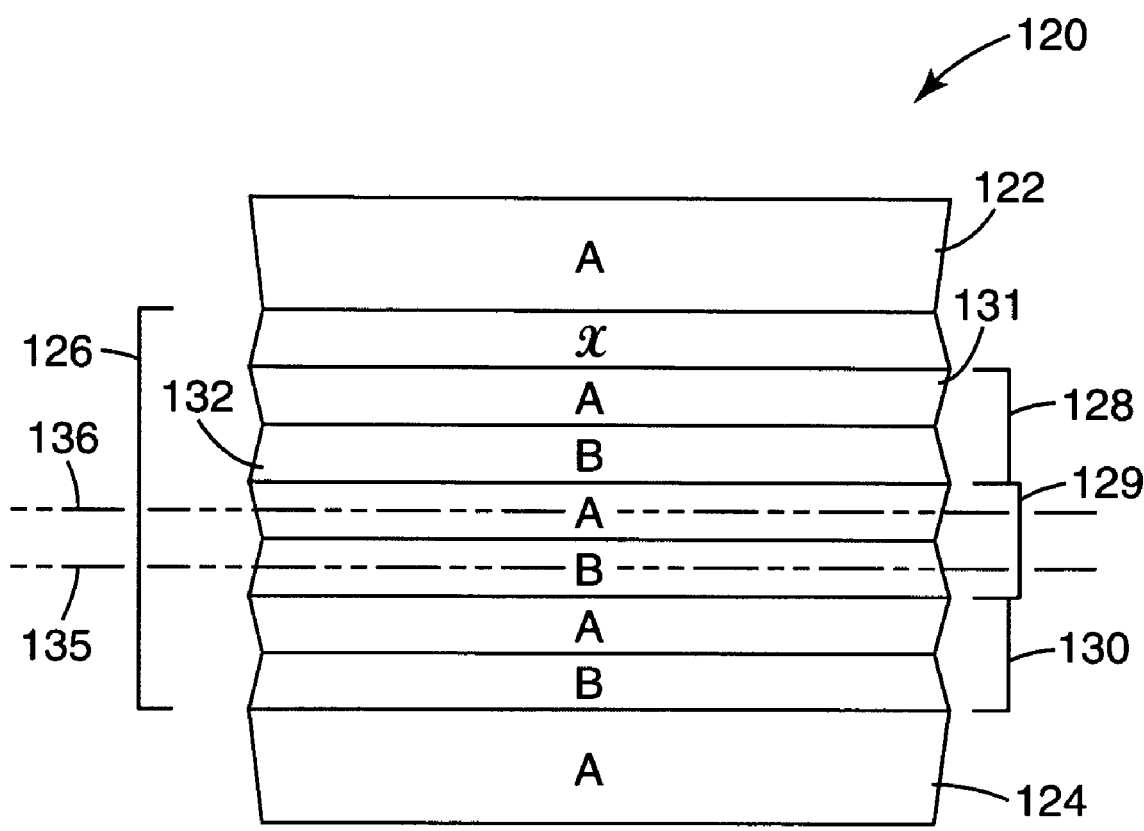
FIG. 4 is a cross sectional view of another quarter wave layer construction for use in a multilayer IR reflecting film.

FIG. 4 shows another IR reflecting film 120 including a first boundary layer 122 of polymer A and a second boundary layer 124 of polymer A bounding an optically active multilayer packet 126. The packet 126 includes an integer number (3) of unit cells 128, 129, 130, each having one optical A layer and one optical B layer of substantially equal quarter wave thickness, and the packet further includes one extra layer X. Therefore, the optical packet 126 does not exhibit an integer number of unit cells. However, if extra layer X is selected to have a quarter wave thickness and is made of polymer A (or a different material with the same refractive index as polymer A), the layer X merges with the first layer 131 of the unit cell 128 and the skin layer 122, and the near integer number of unit cells is maintained. In this construction, the optical packet, which includes the B layer 132 and the layers in unit cells 129 and 130, will have 5 layers. The optical packet then has symmetry about a plane 135. If the layer X is not made of polymer A or a like material, then no merger occurs with the boundary layer 122. In this construction, the optical packet does not have an integer number of unit cells, and the number of layers is equal to 2(3)+1=7. The effective optical packet is also not symmetric about a plane within the packet. However, if the layer X is made of polymer B and has a quarter wave thickness, the effective optical packet will have both a near-integer number of unit cells and mirror symmetry about a plane 136 in the packet.

Figure 5:
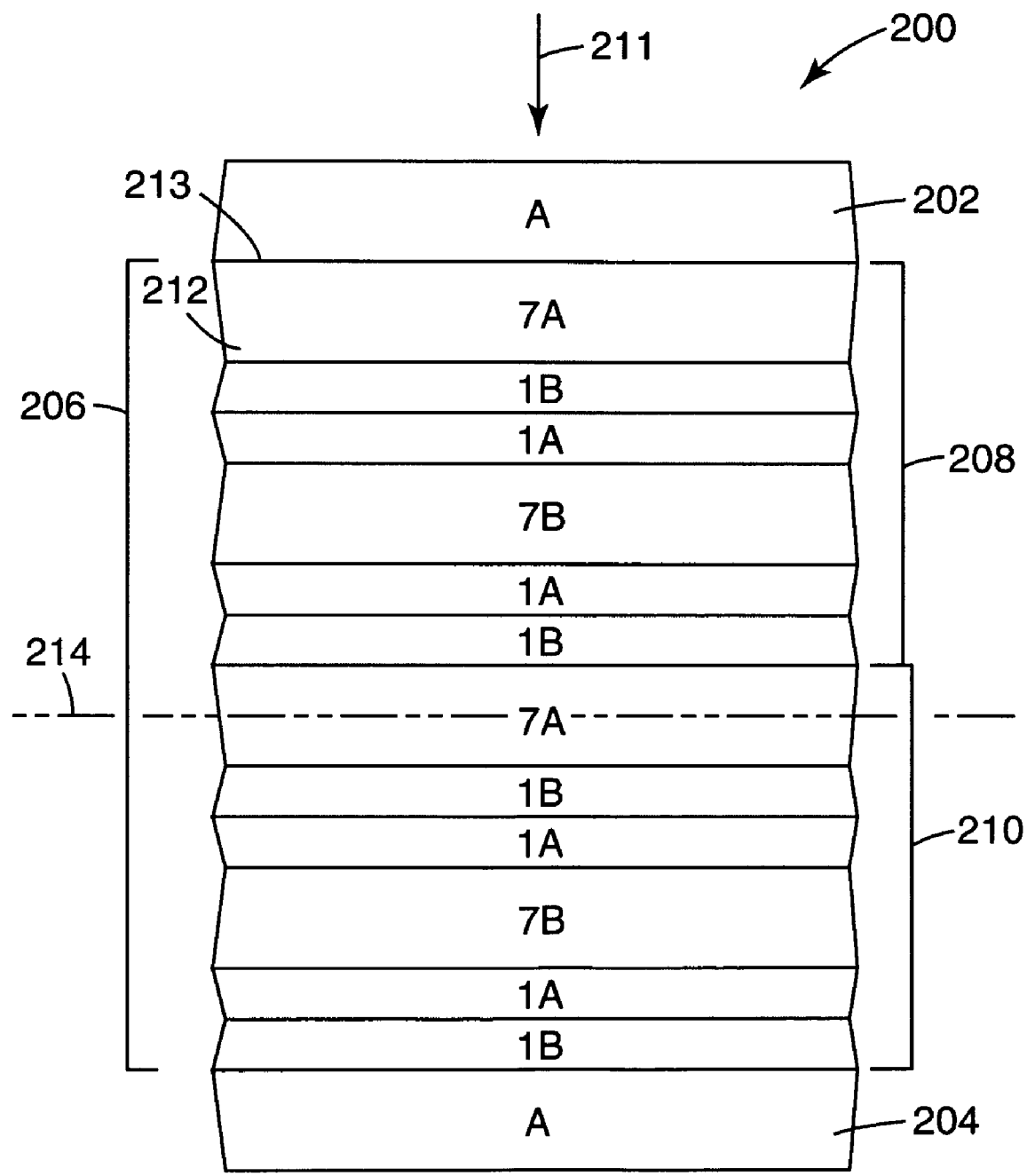
FIG. 5 is a cross sectional view of an illustrative 711 layer construction for use in a multilayer IR reflecting film.

An IR reflecting film with a noise reducing 711 layer construction is shown in FIG. 5. The film 200 includes a first boundary layer 202 of polymer A and a second boundary layer 204 of polymer A bounding an optically active multilayer packet 206. The packet 206 has an integer number (2) of unit cells 208 and 210, each with alternating layers of polymers AB arranged with layer thickness ratios of approximately 7A1B1A7B1A1B. Since the boundary layer 202 is made of the same polymer as the first layer 212 in the unit cell 208, from the perspective of a light ray 211 entering the film the interface 213 between the boundary layer 202 and the layer 212 effectively disappears. This effective merging of the boundary layer and the first layer 212 maintains a near integer number of unit cells (2) in the film construction 200. In addition, the merging of the boundary layer 202 and the layer 212 results in an effective optical packet with 6n−1 layers, where n is the number of unit cells in the packet if one additional optical layer were added. The effective optical packet in FIG. 5 includes the remainder of layers in the unit cell 208, as well as all layers in the unit cell 210, for a total of 6(2)−1=11 layers.

The merging of the boundary layer 202 with the layer 212 also maintains symmetry in the effective optical packet with respect to material and optical thickness, on either side of a plane 214 in the optical packet. The layer arrangement on a first side of the plane 214 will be the same as the layer arrangement on a second side of the plane 214. If the layers in the effective optical packet are not the same thickness, but have a layer thickness gradient in a direction normal to the plane 214, the effective optical packet is said to have pseudo-symmetry with respect to either side of the plane 214. Pseudo-symmetry means that there is a mirror symmetry in the arrangement of polymer materials of the optical layers, and but for the layer thickness gradient there would also be mirror symmetry in the optical thickness arrangement of the optical layers. Reverse pseudo-symmetry has an analogous meaning but where reverse symmetry is substituted for regular symmetry.

Figure 6:
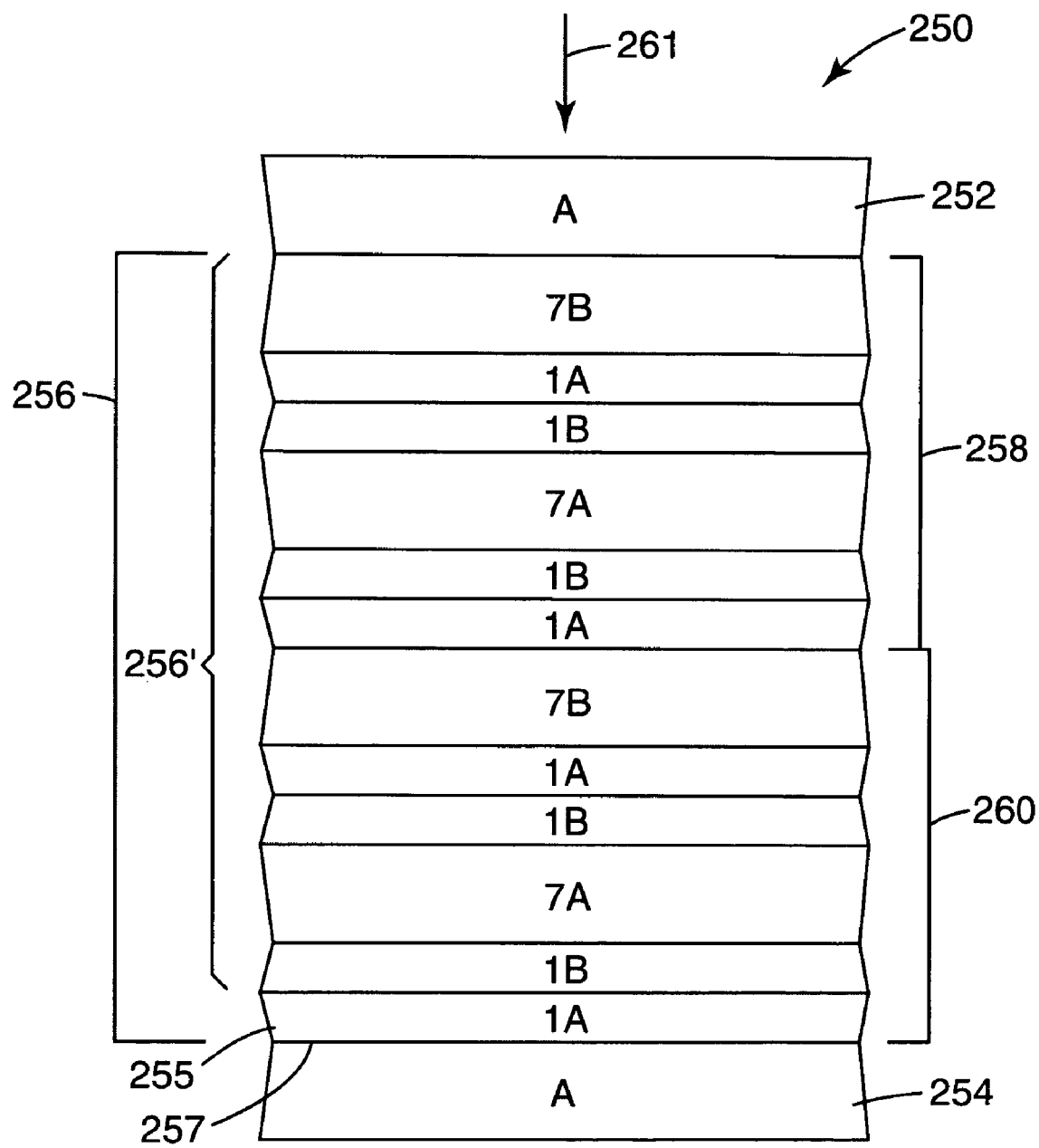
FIG. 6 is a cross sectional view of another 711 layer construction for use in a multilayer IR reflecting film.

Another IR reflecting film with a 711 layer construction is shown in FIG. 6. The film 250 includes a first boundary layer 252 of polymer A and a second boundary layer 254 of polymer A bounding an optically active multilayer packet 256. The packet 256 has an integer number (2) of unit cells 258 and 260, each with alternating layers of polymers AB arranged with layer thickness ratios of approximately 7B1A1B7A1B1A. Since the boundary layer 254 is made of the same polymer as the last layer 255 in the unit cell 260, from the perspective of a light ray 261 entering the film the interface 257 between the boundary layer 254 and the layer 255 effectively disappears. This effective merging of the boundary layer 254 and the layer 255 maintains a near integer number of unit cells (2) in the film construction 250. Since there is no symmetry of layer thickness in a resulting optical packet 256', this construction would be expected to have more noise in the visible region of the spectrum than the construction of FIG. 5.

Figure 7:
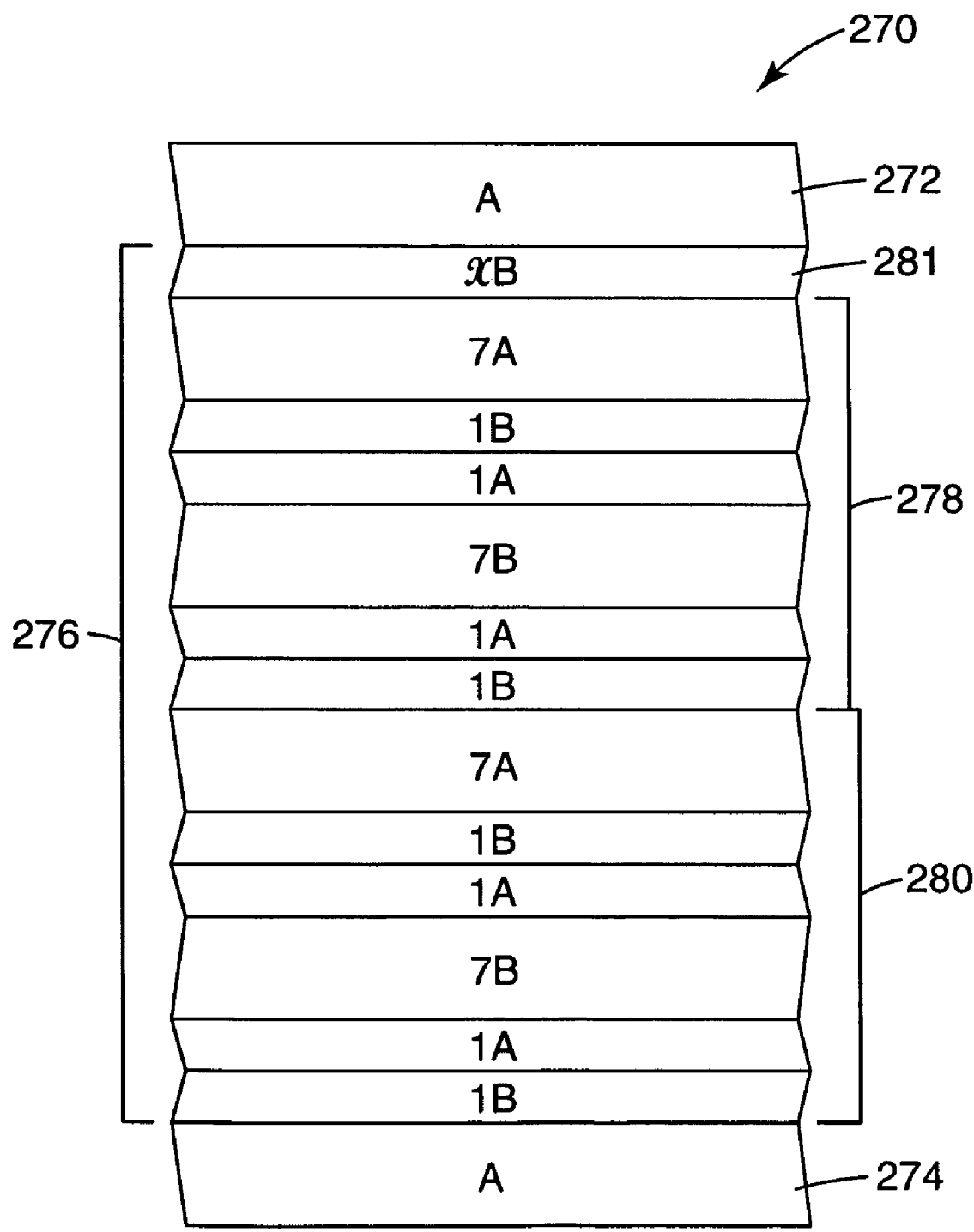
FIG. 7 is a cross sectional view of another 711 layer construction for use in a multilayer IR reflecting film.

Referring to FIG. 7, a film 270 is shown that includes boundary layers 272, 274 of polymer A bounding an optical packet 276. The packet 276 includes two unit cells 278 and 280, each with alternating layers of polymers AB arranged with layer thickness ratios of approximately 7A1B1A7B1A1B, as well as an additional optical layer 281 of polymer B with a thickness X, labeled "XB". Since the boundary layer 272 is made of a different polymer than the layer 281, there is no merger between the boundary layers and the outer layers of the optical packet 276. The optical packet includes the layers in the unit cell 278, 280, as well as layer 281, for a total of [6(2)+1]=13 layers. Regardless of the value of X, the thickness of the layer XB cannot create in the effective optical packet 276 symmetry with respect to polymer layer arrangement and with respect to layer thickness. Since symmetry or reverse symmetry of layer arrangement in the effective optical packet is not present, this construction would be expected to have more noise in the visible region of the spectrum than the construction of FIG. 5.

Figure 8:
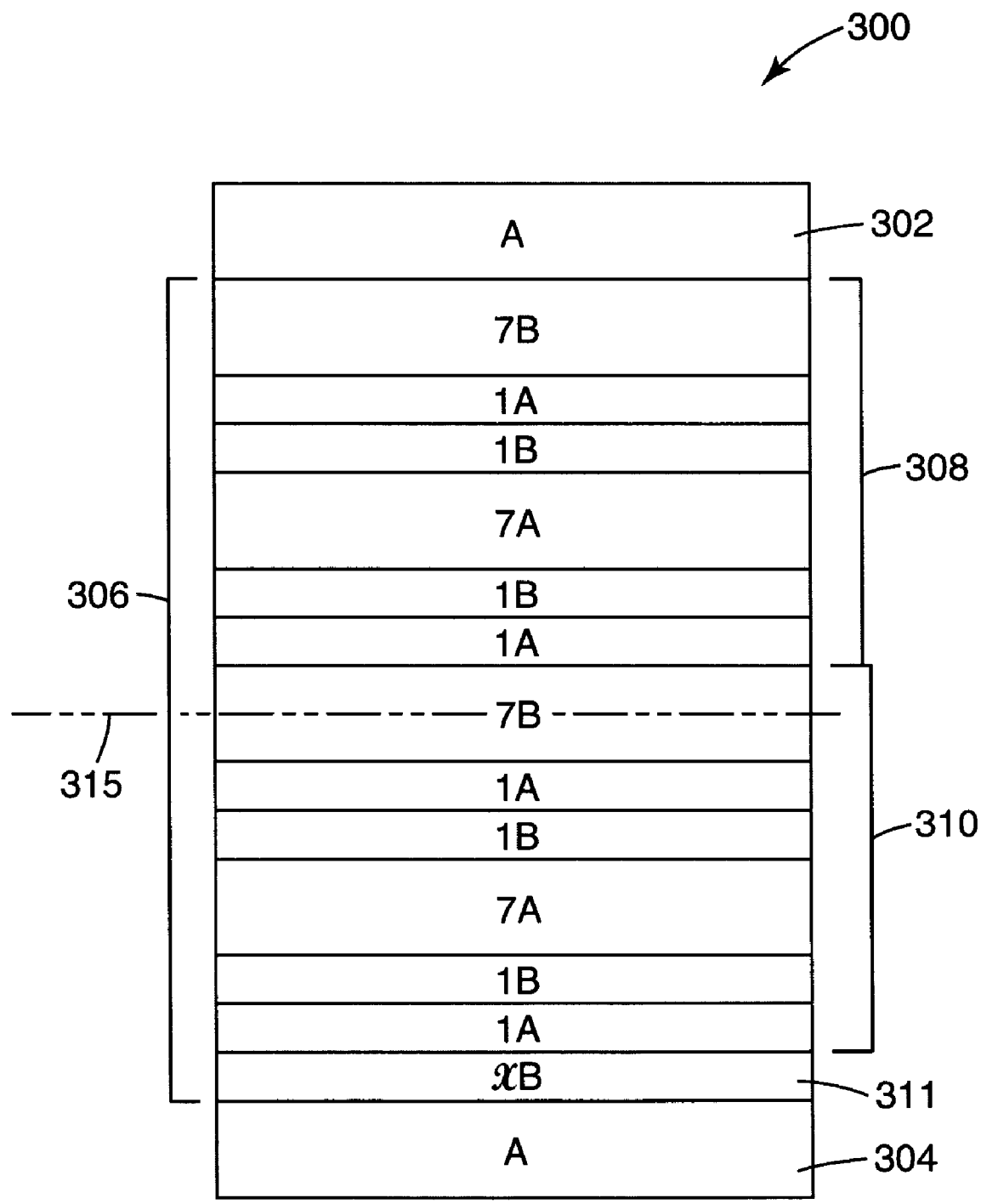
FIG. 8 is a cross sectional view of another 711 layer construction for use in a multilayer IR reflecting film.

Referring to FIG. 8, a film 300 is shown that includes boundary layers 302, 304 of polymer A bounding an optical packet 306. The packet 306 includes two unit cells 308 and 310, each with alternating layers of polymers AB arranged with layer thickness ratios of approximately 7B1A1B7A1B1A, as well as an additional optical layer 311 of polymer B with a thickness X, labeled "XB". Since the boundary layer 304 is made of a different polymer than the layer 311, there is no merger between the boundary layers and the layers of the optical packet 306. The effective optical packet includes the layers in the unit cell 308, 310, as well as layer 311, for a total of 6(2)+1=13 layers. If X=7, the thickness of the layer 311 creates in the effective optical packet 306 symmetry with respect to a plane 315. Since there is a near integer number of unit cells, and symmetry of layer thickness and layer arrangement in the effective optical packet is present, this construction would be expected to have less noise in that region than the construction of FIG. 7.

Figure 9:
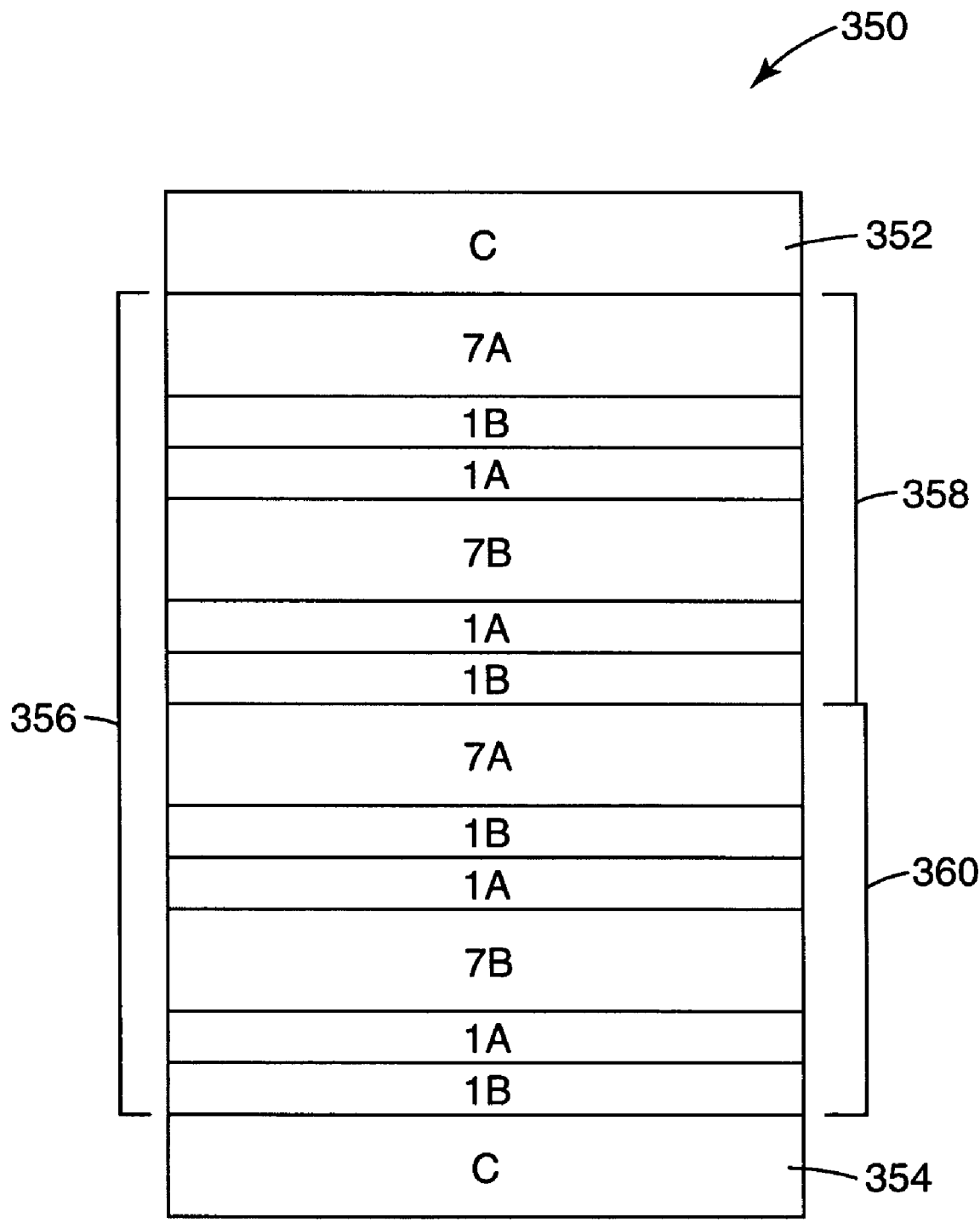
FIG. 9 is a cross sectional view of another 711 layer construction for use in a multilayer IR reflecting film.

Referring to FIG. 9, a film 350 is shown that includes boundary layers 352, 354 of polymer C bounding an optical packet 356. The packet 356 includes two unit cells 358 and 360, each with alternating layers of polymers AB arranged with layer thickness ratios of approximately 7A1B1A7B1A1B. Since the boundary layers 352, 354 are made of a different polymer than the layers in the packet 356, there is no merger between the boundary layers and the outer layers of the optical packet. The effective optical packet 356 consists essentially of the layers in the unit cells 358, 360, for a total of 12 layers. When the polymer C in the boundary layers is different from the polymers A and B that form the layers in the optical packet 356, with an integer number of unit cells, there can be no symmetry with respect to layer arrangement about a plane within the packet. Of course, the refractive index of the polymer C may be higher, lower, or in between the refractive indices A and B. To reduce noise in the visible portion of the spectrum, the refractive index C of the boundary layers is preferably between, and more preferably about midway between, the refractive indices of the layers A, B in the multilayer stack 356.

Figure 10:
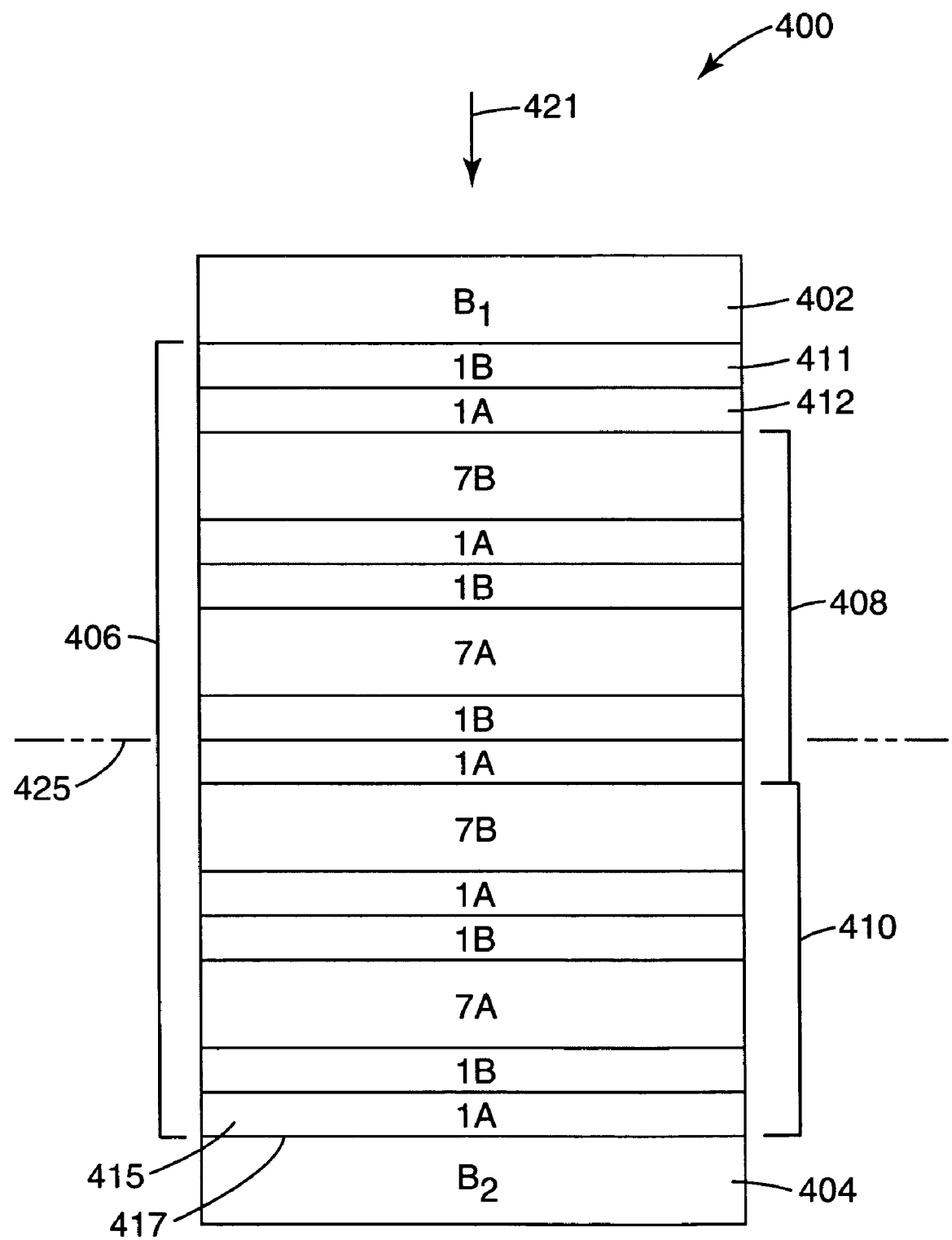
FIG. 10 is a cross sectional view of another 711 layer construction for use in a multilayer IR reflecting film.

Referring to FIG. 10, a film 400 is shown that includes boundary layers 402, 404, made of polymer $B_1$ and $B_2$, respectively, bounding an optical packet 406. The packet 406 includes two unit cells 408 and 410, each with alternating layers of polymers AB arranged with layer thickness ratios of approximately 7B1A1B7A1B1A, as well as two additional layers 411, 412 of layers 1B and 1A, respectively. If the boundary layers 402 and 404 are made of the same polymer as the last layer 415 in the unit cell 410, $B_1=B_2=A$, and from the perspective of a light ray 421 entering the film the interface 417 between the boundary layer 404 and the layer 415 effectively disappears. With this effective merging of the boundary layer 404 and the layer 415, there is no symmetry in the effective optical packet with respect to polymer layer arrangement. However, if $B_1=A$ and $B_2=B$, or if $B_1=B_2=C$, no merger occurs, and the additional layers 411, 412 create reverse symmetry about a plane 425 in the effective optical stack. Since reverse symmetry is present, this layer construction would have less noise in the visible region of the spectrum than other random layer arrangements.

To summarize, to reduce noise in the visible region of the spectrum, it is often desirable to select layer arrangements in which:

(1) each effective optical packet within the optical stack has symmetry or reverse symmetry with respect to a plane in the packet;

(2) each effective optical packet within the optical stack has an integer or near integer number of unit cells;

(3) if a layer thickness gradient is present in an optical packet, the layer arrangement of the effective optical packet has pseudo-symmetry or reverse pseudo-symmetry with respect to a plane in the packet.

Another factor that determines the reflectance characteristics of the film of the invention is the selection of materials for the layers in the stack. Many different materials may be used, and the exact choice of materials for a given application depends on the desired match and mismatch obtainable in the refractive indices between the various optical layers along a particular axis, as well as on the desired physical properties in the resulting product. The films of the invention include an optically active multilayer stack made from only two materials, referred to herein as the first polymer and the second polymer.

At least one of the two polymers in the stack, referred to herein as the first polymer, preferably has a stress optical coefficient with a large absolute value. Such a preferred first polymer is capable of developing a large birefringence when stretched. Depending on the application, the birefringence may be developed between two orthogonal directions in the plane of the film, between one or more in-plane directions and the direction perpendicular to the film plane, or a combination of these. The first polymer should maintain birefringence after stretching, so that the desired optical properties are imparted to the finished film.

To make a reflective, or mirror, film, refractive index criteria apply equally to any direction in the film plane, so it is typical for the indices for any given layer in orthogonal in-plane directions to be equal or nearly so. It is advantageous, however, for the film-plane indices of the first polymer to differ as greatly as possible from the film-plane indices of the second polymer so that each optical layer interface is as highly reflective as possible. For this reason, if the first polymer has an index of refraction higher than that of the second polymer before orientation, it is advantageous that the in-plane indices of refraction increase in the direction of stretch, and the z index decreases to match that of the second polymer. Likewise, if the first polymer has an index of refraction lower than that of the second polymer before orientation, it is advantageous that the in-plane indices of refraction decrease in the direction of stretch, and the z index increases to match that of the second polymer. The second polymer preferably develops little or no birefringence when stretched, or develops birefringence of the opposite sense (positive–negative or negative–positive), such that its film-plane refractive indices differ as much as possible from those of the first polymer in the finished film. These criteria may be combined appropriately with those listed above for polarizing films if a mirror film is meant to have some degree of polarizing properties as well.

For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymers to absorb specific wavelengths, either totally or in part.

The first and second optical layers and the optional non-optical layers of the solar rejection film of the present invention are typically composed of polymers such as, for example, polyesters. The term "polymer" will be understood to include homopolymers and copolymers, as well as polymers or copolymers that may be formed in a miscible blend, for example, by coextrusion or by reaction, including, for example, transesterification. In general, the use of comonomers should not substantially impair the stress optical coefficient or retention of birefringence after stretching. In practice, these restrictions impose an upper limit on the comonomer content, the exact value of which will vary with the choice of comonomer(s) employed. Some compromise in optical properties may be accepted, however, if comonomer incorporation results in improvement of other properties. The terms "polymer", "copolymer", and "copolyester" include both random and block copolymers.

Polyesters for use in the multilayer reflective mirrors and polarizers of the present invention generally include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1–C10 straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

A polyester useful in the solar rejection films of the present invention is polyethylene naphthalate (PEN), which can be made, for example, by reaction of naphthalene dicarboxylic acid with ethylene glycol. Polyethylene 2,6-naphthalate (PEN) is frequently chosen as a first polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Other semicrystalline naphthalene dicarboxylic polyesters suitable as first polymers include, for example, polybutylene 2,6-naphthalate (PBN), polyethylene terephthalate (PET), and copolymers thereof. Non-polyester polymers are also useful in creating polarizer films. For example, polyether imides can be used with polyesters, such as PEN and coPEN, to generate a multilayer reflective mirror. Other polyester/non-polyester combinations, such as polyethylene terephthalate and polyethylene (e.g., those available under the trade designation Engage 8200 from Dow Chemical Corp., Midland, Mich.), can be used. Suitable first polymers are described, for example, in U.S. Pat. No. 6,783,349 (counterpart to WO 99/36248 (Neavin et al.)), and U.S. Pat. No. 6,352,761 (counterpart to WO 99/36262 (Hebrink et al.)), U.S. Pat. No. 6,498,683 (counterpart to WO 01/38907 (Condo et al.)), and U.S. Pat. No. 6,268,961 (Nevitt et al.).

A preferred first polymer is a coPEN derived with carboxylate subunits derived from 90 mol % dimethyl naphthalene dicarboxylate and 10 mol % dimethyl terephthalate and glycol subunits derived from 100 mol % ethylene glycol subunits and an intrinsic viscosity (IV) of 0.48 dL/g. The index of refraction is approximately 1.63. The polymer is herein referred to as low melt PEN (90/10). Another preferred first polymer is a PET having an inherent viscosity of 0.74 dL/g, available from Eastman Chemical Company (Kingsport, Tenn.). Another preferred first polymer is a PET having an inherent viscosity of 0.84 dL/g, available from E.I. duPont de Nemours & Co., Inc.

The other required polymer, referred to herein as the second polymer, should be chosen so that in the finished film, the refractive index, in at least one direction, differs significantly from the index of refraction of the first polymer in the same direction. Because polymeric materials are typically dispersive, that is, the refractive indices vary with wavelength, these conditions should be considered in terms of a particular spectral bandwidth of interest, such as some or all of the visible or near infrared spectral regions, although in practice the refractive index variation is relatively minor and an average over the band of interest can be used. It will be understood from the foregoing discussion that the choice of a second polymer is dependent not only on the intended application of the multilayer optical film in question, but also on the choice made for the first polymer, as well as processing conditions.

The second optical layers can be made from a variety of second polymers having glass transition temperature compatible with that of the first polymer. Examples of suitable polymers include vinyl polymers and copolymers made from monomers such as vinyl naphthalenes, styrene, maleic anhydride, acrylates, and methacrylates. Examples of such polymers include polyacrylates, polymethacrylates, such as poly(methyl methacrylate) (PMMA), and isotactic or syndiotactic polystyrene. Other polymers include condensation polymers such as polysulfones, polyamides, polyurethanes, polyamic acids, and polyimides. In addition, the second optical layers can be formed from polymers and copolymers such as polyesters and polycarbonates.

Preferred second polymers are homopolymers of polymethylmethacrylate (PMMA), such as those available from Ineos Acrylics, Inc., Wilmington, Del., under the trade designations CP71 and CP80, or polyethyl methacrylate (PEMA), which has a lower glass transition temperature than PMMA. Additional preferred second polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomer units, or a blend of PMMA and poly(vinylidene fluoride) (PVDF) such as that available from Solvay Polymers, Inc., Houston, Tex. under the trade designation Solef 1008. Yet other preferred second polymers include polyolefin copolymers such as poly(ethylene-co-octene) (PE-PO) available from Dow-Dupont Elastomers under the trade designation Engage 8200, poly (propylene-co-ethylene) (PPPE) available from Fina Oil and Chemical Co., Dallas, Tex., under the trade designation Z9470, and a copolymer of atatctic polypropylene (aPP) and isotatctic polypropylene (iPP) available from Huntsman Chemical Corp., Salt Lake City, Utah, under the trade designation Rexflex W111. Second optical layers can also be made from a functionalized polyolefin, such as linear low density polyethylene-g-maleic anhydride (LLDPE-g-MA) such as that available from E.I. duPont de Nemours & Co., Inc., Wilmington, Del., under the trade designation Bynel 4105.

Particularly preferred combinations of first/second polymers for optical layers in IR reflective mirrors include PEN/PMMA, PET/PMMA or PET/coPMMA, PEN/Ecdel, PET/Ecdel, PEN/sPS, PET/sPS, PEN/coPET, PEN/PETG, and PEN/THV. Ecdel is a trade designation for a copolyester ether elastomer available from Eastman Chemical Company (Kingsport, Tenn.). THV is a trade designation for a fluoropolymer commercially available from Minnesota Mining and Manufacturing Company (3M), St. Paul, Minn. PMMA refers to polymethyl methacrylate, coPET refers to a copolymer or blend based upon terephthalic acid (as described above), and PETG refers to a copolymer of PET employing a second glycol (usually cyclohexanedimethanol). sPS refers to syndiotactic polystyrene.

For mirror films, a match of the refractive indices of the first polymer and second polymer in the direction normal to the film plane is preferred, because it provides each optical interface with constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/Ecdel system, in which the analogous indices might be 1.66 and 1.51 for PET, while the isotropic index of Ecdel might be 1.52. The match of refractive indices $n_z$ of adjacent pairs of optical layers in the z-direction (normal to the film plane) can be advantageous whether the multilayer film is a mirror film or a polarizing film. Further, refractive index relationships that are less stringent than a perfect z-index match ($\Delta n_z=0$) are often useful, such as: $|\Delta n_z|<0.05$; $|\Delta n_z|<0.5*MAX(|\Delta n_x|, |\Delta n_y|)$; $|\Delta n_z|<0.25*MAX(|\Delta n_x|, |\Delta n_y|)$, and $|\Delta n_z|<0.1*MAX(|\Delta n_x|, |\Delta n_y|)$. Reference is made to U.S. Pat. No. 5,882,774 (Jonza et al.).

Materials selected for the non-optical boundary layers should impart or improve film properties such as, for example, tear resistance, puncture resistance, toughness, weatherability, and solvent resistance. Typically, one or more of the non-optical layers are placed so that at least a portion of the light to be transmitted, polarized, or reflected by the first and second optical layers also travels through these layers (i.e., these layers are placed in the path of light which travels through or is reflected by the first and second optical layers). Properties of the non-optical layers such as crystallinity and shrinkage characteristics need to be considered along with the properties of the optical layers to give the film of the present invention that does not crack or wrinkle when laminated to severely curved substrates.

The non-optical layers may be of any appropriate material and can be the same as one of the materials used in the optical stack. For example, factors to be considered in selecting a material for a non-optical layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the tough and optical layers, viscoelastic response, relaxation and crystallization behavior under draw conditions, thermal stability at use temperatures, weatherability, ability to adhere to coatings and permeability to various gases and solvents. Of course, as previously stated, it is important that the material chosen not have optical properties deleterious to those of the optical stack. The non-optical layers may be formed from a variety of polymers, such as polyesters, including any of the polymers used in the first and second optical layers. In some embodiments, the material selected for the non-optical layers is similar to or the same as the material selected for the first or second optical layers. The use of coPEN, coPET, or other copolymer material for skin layers reduces the splittiness (i.e., the breaking apart of a film due to strain-induced crystallinity and alignment of a majority of the polymer molecules in the direction of orientation) of the multilayer optical film. The coPEN of the non-optical layers typically orients very little when stretched under the conditions used to orient the first optical layers, and so there is little strain-induced crystallinity.

Preferably, the polymers of the first optical layers, the second optical layers, and the optional non-optical layers are chosen to have similar rheological properties (e.g., melt viscosities) so that they can be co-extruded without flow disturbances. Typically, the second optical layers, skin layers, and optional other non-optical layers have a glass transition temperature, $T_g$, that is either below or no greater than about 40° C. above the glass transition temperature of the first optical layers. Preferably, the glass transition temperature of the second optical layers, skin layers, and optional non-optical layers is below the glass transition temperature of the first optical layers. When length orientation (LO) rollers are used to orient the multilayer optical film, it may not be possible to use desired low $T_g$ skin materials, because the low $T_g$ material will stick to the rollers. If LO rollers are not used, then this limitation is not an issue. For some applications, preferred skin layer materials include PMMA and polycarbonate because of their durability and their ability to protect the optical stack from UV radiation.

As mentioned above, any skin layers and any other non-optical layers have optical thicknesses of at least about ten wavelengths of light in the spectral region of interest. The thickness of such non-optical layers is generally at least four times, typically at least 10 times, and can be 100 times or more, the thickness of at least one of the individual first and second optical layers. The thickness of the non-optical layers can be selected to make a multilayer reflective film having a particular overall thickness.

Figure 26:
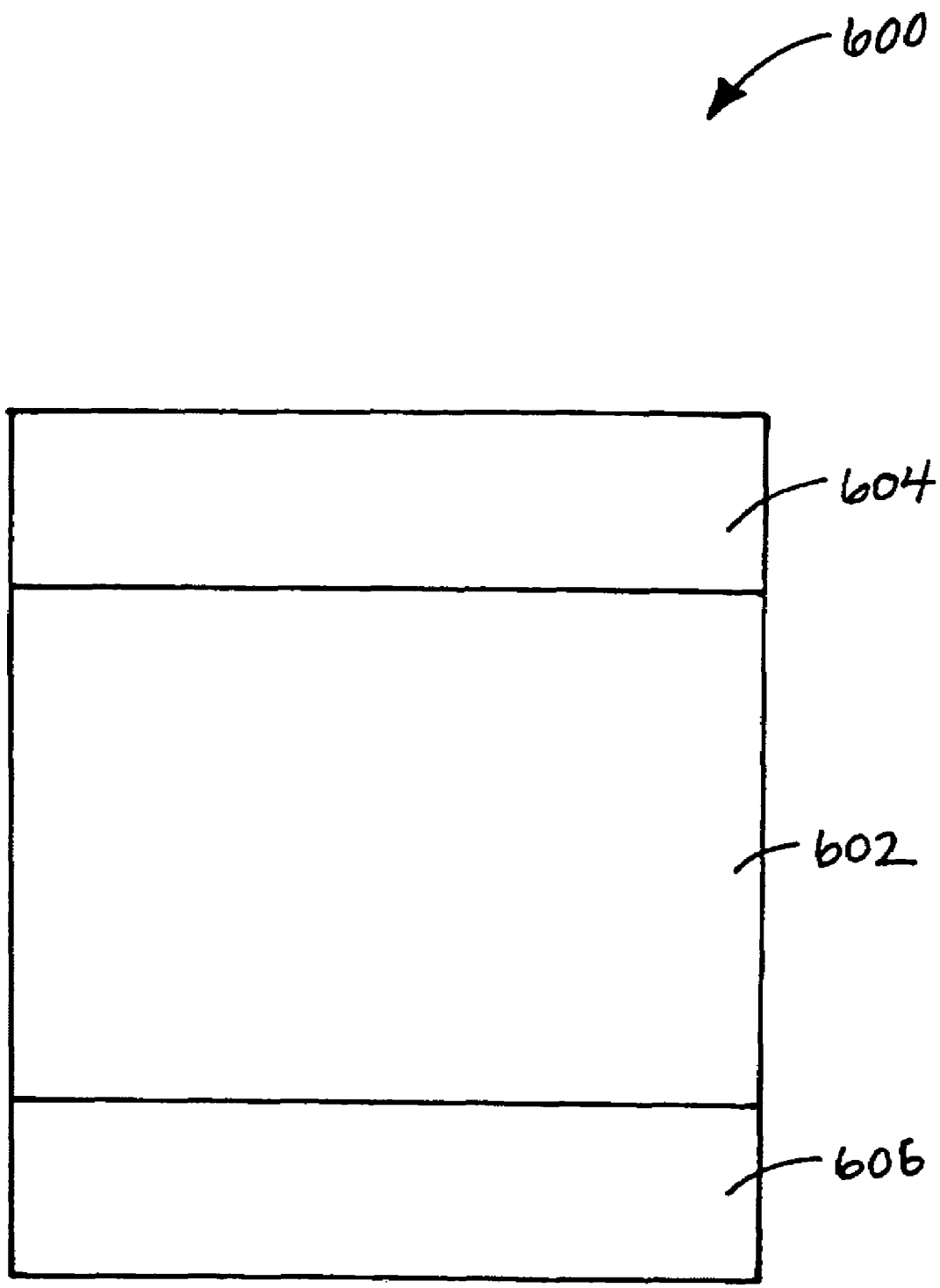
FIG. 26 is a cross-sectional view of an illustrative multilayer IR reflecting film article.

FIG. 26 generally illustrates a film article 600 including an IR reflecting filem 602 and additional layers 604 and 606. In one embodiment, the IR reflecting film 602 is similar to any optical packet described above (e.g., 10, 50, 100, 120, 200, 250, 270, 300, 350, 400). In one embodiment, the additional layer(s) 604 and/606 include skin layers that may be coextruded on one or both major surfaces of the multilayer stack during its manufacture to protect the multilayer stack from the high shear along the feedblock and die walls, and often an outer layer with the desired chemical or physical properties can be obtained by mixing an additive, such as, for example, a UV stabilizer, into the polymer melt that makes up the skin layer, and coextruding the skin layer with altered properties onto one or both sides of the multilayer optical stack during manufacture. Alternatively, additional layers may be coextruded on the outside of the skin layers during manufacture of the multilayer film; they may be coated onto the multilayer film in a separate coating operation; or they may be laminated to the multilayer film as a separate film, foil, or rigid or semi-rigid reinforcing substrate.

In one embodiment, the layers 604 and 606 each include one or more various functional layers or coatings can be added to the films of the present invention to alter or improve their physical or chemical properties, particularly along the surface of the film or device. Such layers or coatings may include, for example, low friction coatings or slip particles to make the film easier to handle during the manufacturing process; particles to add diffusion properties to the multilayer optical film or to prevent wet-out or Newton's rings when the multilayer optical film is placed next to another film or surface; adhesives such as pressure sensitive adhesives and hot melt adhesives, adhesion promoters, primers and low adhesion backside materials for use when the film is to be used in adhesive roll form. The functional layers or coatings may also include shatter resistant, anti-intrusion, or puncture-tear resistant films and coatings, for example, the functional layers described in commonly assigned U.S. patent application Ser. No. 09/591,584 (Dietz), entitled GLAZING ELEMENT AND LAMINATE FOR USE IN THE SAME, priority document for PCT Publication WO 01/96115 (Dietz). Additional functional layers or coatings may include vibration-damping film layers such as those described in WO 98/26927 (Landin et al.) and U.S. Pat. No. 5,773,102 (Rehfeld), barrier layers to provide protection or to alter the transmissive properties of the film or device towards liquids, such as water or organic solvents, or gases, such as oxygen, water vapor or carbon dioxide; and/or substrates and support layers designed to improve the mechanical integrity or strength of the film or device. These functional components may be incorporated into one or more skin layers, or they may be applied as a separate film or coating.

For some applications, it may be desirable to alter the appearance and/or performance of the multilayer optical film by coloring the film, such as by laminating a dyed film to the multilayer optical film, applying a pigmented coating to the surface of the film, or including a dye or pigment in one or more of the materials used to make the film, such as in the skin layer. The dye or pigment typically absorbs in one or more selected regions of the spectrum, including portions of the infrared, ultraviolet, and/or visible spectrum. The dye or pigment can be used to compliment the properties of the film, particularly where the film transmits some frequencies while reflecting others. A particularly useful pigmented layer that can be combined with the multilayer optical film of the present invention is described in U.S. Pat. No. 6,811,867 (McGurran et al.), which has a counterpart PCT Publication WO 01/58989 (McGurran et al.). This film may be laminated, extrusion coated or coextruded as a skin layer on the multilayer film. The pigment loading level may be varied between about 0.01 and about 1.0% by weight to vary visible light transmission from about 10 to about 90%. In practice, the pigment loading level is selected such that when the pigmented film layer is combined with the multilayer optical film, the percent visible transmission is reduced to about 80–85% of the multilayer optical film's normal value, $T_{vis}$, to the legal limit of about 70–75% measured at an angle normal to a laminate construction. This improves the overall shading coefficient of the multilayer film construction.

The use of a UV absorptive material in a cover layer is also desirable because it may be used to protect the inner layers that may be unstable when exposed to UV radiation. The multilayer optical films can also be treated with, for example, inks, dyes, or pigments to alter their appearance or to customize the film for specific applications. Thus, for example, the films can be treated with inks or other printed indicia such as those used to display product identification, advertisements, warnings, decoration, or other information. Various techniques can be used to print on the film, such as, for example, screen printing, letterpress printing, offset printing, flexographic printing, stipple printing, laser printing, and so forth, and various types of ink can be used, including one and two component inks, oxidatively drying and UV-drying inks, dissolved inks, dispersed inks, and 100% ink systems.

For some applications, it may be desirable to have one or more anti-reflective layers or coatings that serve to increase transmission and to reduce reflective glare. Suitable layers or coatings can include, for example, conventional vacuum coated dielectric metal oxide or metal/metal oxide optical films, silica or zirconia sol gel coatings, and coated or coextruded anti-reflective layers such as those derived from low index fluoropolymers. When the solar rejection film of the present invention is laminated between sheets of a mechanical energy absorbing material such as PVB, the index of refraction of the skin layer can be selected to minimize reflection at the interface caused by the large difference in refractive indices between the PVB and multilayer optical stack materials. For example, the skin layer can be selected so that its index of refraction is the same as that of PVB, intermediate that of PVB and that of the high index first optical material, or intermediate that of PVB and the composite index of refraction of the optical stack. In some embodiments, protective boundary layers (PBLs) are used between the skin and optical stack, or between the optical stacks in the multiplied system. In these embodiments, the PBL material can be selected to minimize the reflection at the additional interfaces between the skin and PBL and between the PBL and optical stack. For example, the PBL can be selected so that its index of refraction is the same as the skin, intermediate between the skin and the composite index of the optical stack, or equal to that of the composite optical stack. Preferred skin and PBL layers to minimize the difference in refractive index between the PVB and the optical stack include CoPEN and CoPET.

Additional functional layers or coatings that may be added to the multilayer optical film include, for example, metal layers and other conductive layers. The metal layers may be made of, for example, gold, silver, aluminum, and/or nickel, as well as dispersions of these and other metals. In a vehicular windshield construction, the metal layers may be used for antennae, de-fogging and de-misting, defrosting or electromagnetic shielding. Other layers include antistatic coatings or films; flame retardants; UV stabilizers; abrasion resistant or hardcoat materials; optical coatings; anti-fogging materials, magnetic or magneto-optic coatings or films; liquid crystal panels, electrochromic or electroluminescent panels, photographic emulsions; prismatic films, and holographic films or images. Additional functional layers or coatings are described, for example, in WO 97/01440 (Gilbert et al.), WO 99/36262 (Hebrink et al.), and WO 99/36248 (Neavin et al.). These functional components may be incorporated into one or more skin layers, or they may be applied as a separate film or coating. Or, the multilayer film itself may be modified by embossing, holographic images, corona, e-beam or plasma treatments.

The IR reflecting multilayer optical films of the invention can be made according to the teachings of U.S. Patent Application Publication No. 2001-0022982 (Neavin et al.) and U.S. Pat. No. 6,797,396 (Liu et al).

The multilayer IR mirror film described above may be laminated to a wide variety of planar and non-planar substrates. Typical substrate materials include glazing materials such as glass, which may be insulated, tempered, laminated, annealed, or heat strengthened, and plastics, such as polycarbonates and polymethylmethacrylate (PMMA). The term non-planar substrate means a substrate with a continuous or compound curvature. A compound curvature means that the substrate curves in two different, non-linear directions from a single point.

Figure 11A:
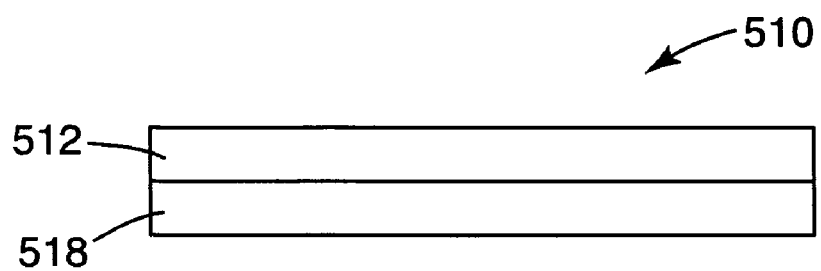
FIG. 11A is a cross sectional view of a doublet pre-laminate structure that may be bonded to one or more glass sheets to make a vehicular safety glazing laminate.
Figure 11B:
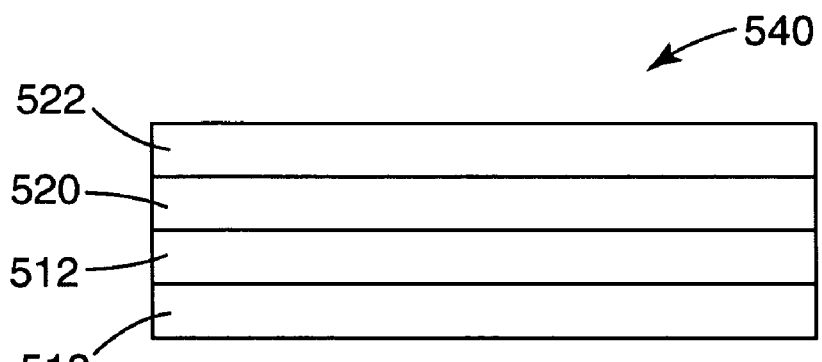
FIG. 11B is a cross-sectional view of a triplet pre-laminate structure that may be bonded to one or more glass sheets to make a vehicular safety glazing laminate.

Referring to FIG. 11A, a doublet pre-laminate structure 510 is shown that may be bonded to one or more planar or non-planar glazing sheets to make a vehicular safety glazing laminate. The pre-laminate 510 includes a functional layer 512 made of the low noise multilayer IR reflecting film of the invention. The functional layer 512 may be bonded on at least one side to at least one layer 518 of a mechanical energy absorbing layer, preferably plasticized PVB, to form the doublet laminate 510. The functional layer 512 may be bonded as shown in FIG. 11B to a second layer 520 of PVB to form a triplet pre-laminate construction as included in the optical body 540. One or the other or both of the PVB layers 518, 520 may include additional performance enhancing layers, such as, for example, a shade band layer 522 on the PVB layer 520.

Figure 12:
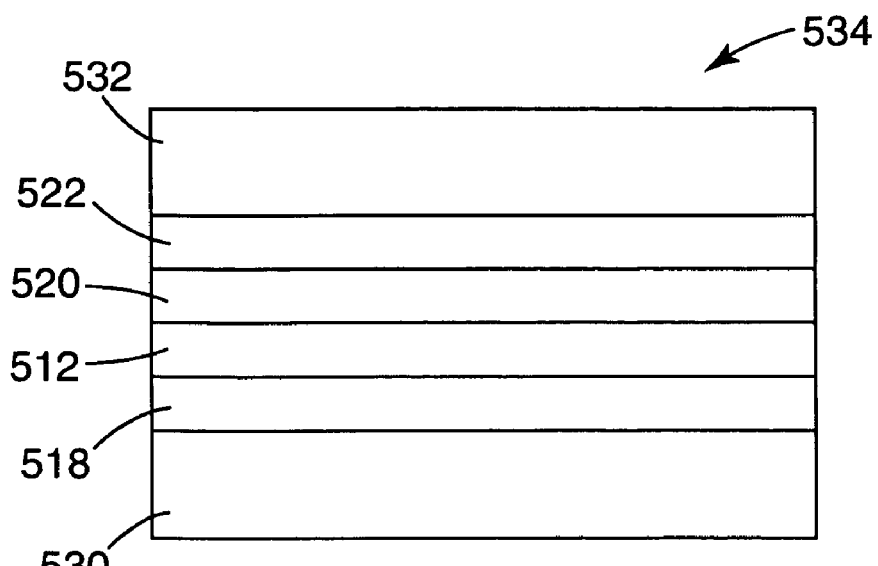
FIG. 12 is a cross-sectional view of a safety glazing laminate for a vehicle.

Referring to FIG. 12, once the pre-laminate structure 510 (FIG. 11A) or 540 (FIG. 11B) is formed, it may be matched with at least one, preferably two, planar or non-planar sheets of glazing material such as glass 530, 532 to form a safety glazing laminate 534.

To bond the PVB and IR film layers or the pre-laminate 510 or 540 to the glazing sheets 530, 532, the layers of PVB and IR film or the pre-laminate and the glazing sheets are assembled by placing them atop one another to form a unitary laminate structure 534. The layers of the laminate 534 are then bonded together and air is removed from the construction. During this step it is preferable to heat the laminate construction in an oven to a temperature below the $T_g$ of the dominant polymer in the IR reflecting film 512. This allows the PVB layers 518, 520 to build some adhesion with the film 512 or the glass 530, 532 while the film 512 shrinks to conform to the shape of the laminate.

The laminate 534 may be bonded and de-aired by several different methods. One method uses a vacuum de-airing process in which a flexible band is placed around the edge of the laminate and connected to a vacuum system while the laminate is heated to generate a temporary bonding between the glass and PVB. Another method also uses a vacuum de-airing process where the laminate is put into a bag that is connected to a vacuum system. Yet another method uses a pressure roller device, referred to herein as a nip roller, which applies pressure to the laminate to de-air and to promote bonding between the layers.

The laminate 534 may be bonded and de-aired in one nip roller or preferably passes through a series of nip rollers as the temperature of the laminate is gradually increased. As the temperature of the laminate 534 increases, the film 512 and the PVB layers 518, 520 begin to conform to the shape of the glass sheets 530, 532. The film 512 also shrinks and/or stretches locally to conform to the shape of the construction.

The laminate 534 is then heated in an autoclave to a maximum temperature of about 280° F. to about 300° F., depending on the viscosity characteristics of the PVB, to cause the PVB layers 518, 520 and the functional layer 512 to conform to the contours of the glass sheets 530, 532 and form an optical structure. The maximum pressure, typically greater than about 165 psi, should also be applied at this time. This allows the PVB to flow and spread to fill up voids, make a uniform sandwich construction, and bond the components of the laminates together firmly, while dissolving air in the PVB in a minimal time frame.

Preferably, the laminate 534 with IR film in the construction is cooled in a slow, controlled fashion, especially around the $T_g$ of the dominant polymer in the film. This reduces wrinkling due to the recovery of the thermal expansion of the IR film and relaxes any stresses in the laminate construction. If the temperature is reduced too quickly during this cycle, the lateral force on the film or PVB may cause de-lamination, particularly on the edges of the laminate. The pressure should be maintained until the temperature is sufficiently lowered below the $T_g$ of the dominant material in the film to make sure the structure established in the laminate is locked in. Preferably, the cooling occurs at an oven air temperature cooling rate of less than about 13° F. per minute, in the vicinity of the $T_g$ of the dominant polymer in the film.

The present invention will now be described with reference to the following non-limiting examples. Such examples can be used in automotive window applications, architectural applications, and like IR filtering applications.

EXAMPLES

Example 1

An IR reflective multilayer film with a 711 construction was simulated via computer model so that it included unit cells with layers having optical thickness ratios of 7A1B1A7B1A1B. Skin and protective boundary layers were applied that had the same index of refraction as one of the optical layers.

In Example 1a, the film had the following layer construction:
(skin/PBL_A) 7A1B1A7B1A1B ... 7A1B1A7B1A1B (skin/PBL$_{13}$A)

In Example 1b, the film had the following layer construction:
(skin/PBL_A) 7B1A1B7A1B1A ... 7B1A1B7A1B1A (skin/PBL_A)

In both Examples 1a and 1b, the outer most A layer in the optical packet merges with skin/PBL, so the total number of layers in the effective optical packet is 6n−1, where n is the number of unit cells in the packet before merging. For these examples n was set to 32. Also, both Examples 1a and 1b used a simple linear layer thickness gradient of 1.27 (the ratio of the optical thickness of the thickest to the thinnest optical repeat units in the optical packet).

In Example 1a, the effective optical packet has pseudo-symmetry with respect to layer thickness and layer arrangement. In Example 1b, the effective optical packet does not have pseudo-symmetry.

The computer-simulated spectra were obtained for the constructions of Examples 1a and 1b, each having three optical packets. The optical stack was constructed as follows: skin/PBL (packet 1) PBL (packet 2) PBL (packet 3) skin/PBL. The high index polymer used in the optically active packets, PBLs and skins was low melt point PEN with index of refraction 1.73 (along both in-plane directions), and the low index polymer in the packets was PMMA with index 1.49 (along all directions). Packets 2 and 3 were identical to packet 1 except for a scaling factor of 1.11 and 1.22 respectively, in order to achieve a broadened reflection band. Such scaling factors can be achieved in practice by use of a 3-channel asymmetric multiplier. The PBL layers between packets 1 and 2 and between packets 2 and 3 had physical thicknesses of 2896 nm, and the skin/PBL outer layer on each side of the construction had a physical thickness of 5792 nm.

Figure 13:
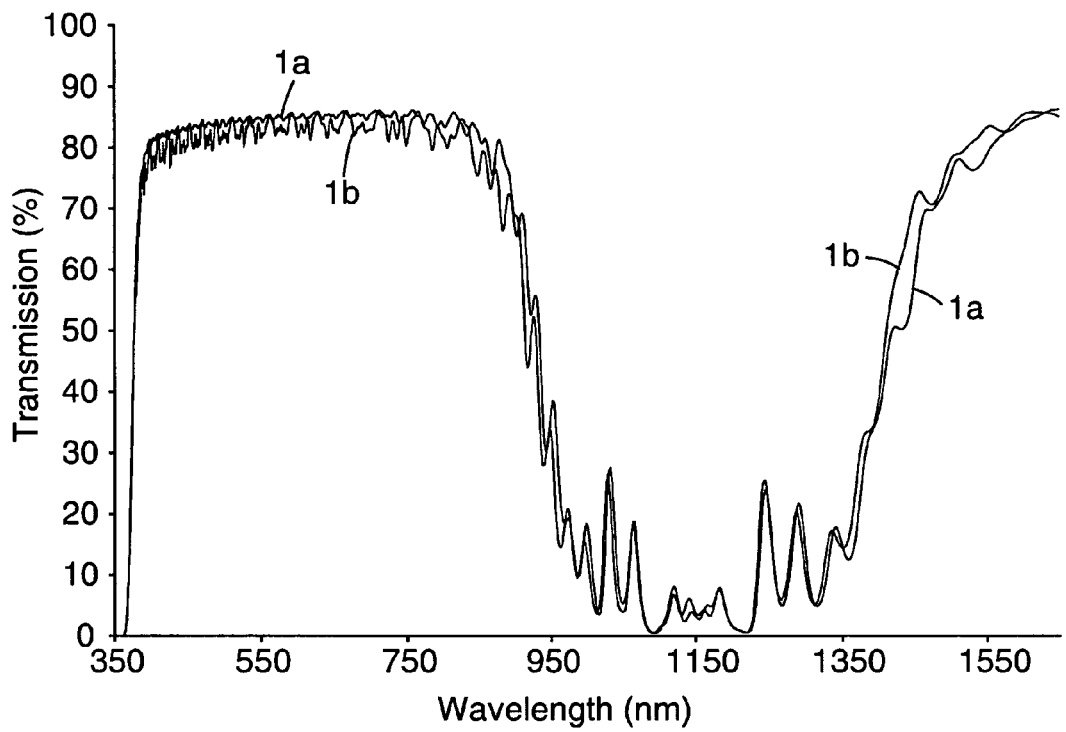
FIG. 13 shows computed transmission spectra at normal incidence for multilayer IR film embodiments with a 711 layer construction.

The simulated transmission spectra at normal incidence for Examples 1a and 1b are shown in FIG. 13. The asymmetrical construction (Example 1b) has significant noise and lower transmission in the visible wavelength region.

The values for standard photometric parameters L*, a*, b* and for photopic transmission Y (also referred to as $T_{vis}$ in the automotive arts, which gives different weight to the raw spectral transmission at different wavelengths within the visible spectrum as a function of the average photopic human eye response) for both the IR reflecting films are shown in Table 1 below. An automobile safety glazing including these films was also computer-simulated. The films were modeled as laminated to glass panels to form the following construction:

glass 58/15 mil PVB/IR reflecting film/15 mil PVB/glass 58, where "glass 58" refers to standard solar glass type GR-58 available from Pilkington Plc. The values for photometric parameters L*, a*, b* and photopic transmission Y for these constructions were also calculated and are listed in Table 1.

TABLE 1

| Construction | L* | a* | b* | Y |
| --- | --- | --- | --- | --- |
| Film Example 1a | 93.75 | −0.03 | 1.08 | 84.69 |
| Film Example 1b | 93.04 | −0.01 | 1.38 | 83.06 |
| Laminate Example 1a | 90.90 | −6.02 | 1.96 | 78.26 |
| Laminate Example 1b | 90.16 | −5.97 | 2.28 | 76.64 |

The number of unit cells and number of layer packets does not change the symmetry of the multilayer stack. They can be odd or even numbers as long as they are integers before merging with the skins/PBLs. When the film comprises multiple layer packets separated by non-optical layers, the symmetry of each layer packet is considered individually.

Figure 14:
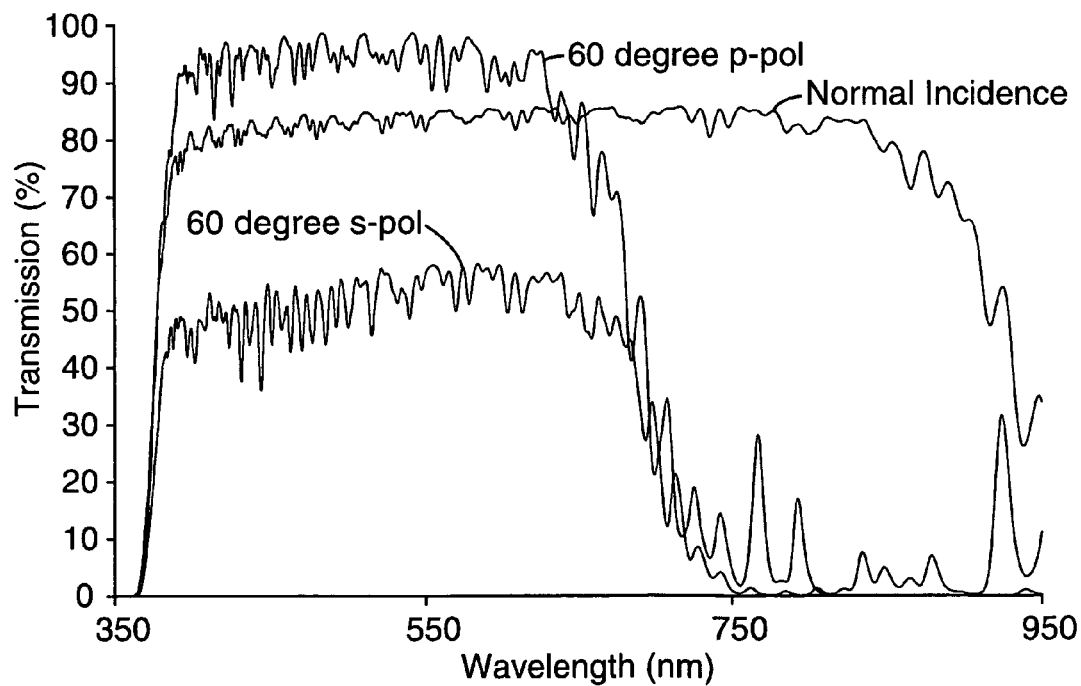
FIG. 14 compares the computed normal incidence transmission spectra with computed 60° transmission spectra for s- and p-polarization, for one of the multilayer IR film embodiments of FIG. 13.

For the film of Example 1b, the normal incidence spectrum was substantially independent of polarization. The normal incidence spectrum was compared to the 60° spectrum, and the results are shown in FIG. 14. The noise is high for both p-polarized light and s-polarized light at the 60° angle when the normal incident spectra had noise. The spectrum at normal incidence was substantially independent of polarization, indicative of balanced in-plane refractive indices.

Example 2

IR reflective multilayer IR films were modeled by adding an additional layer B with (relative) thickness x between the outer most A layer and skin/PBL of the construction in Example 1.

In Example 2a, the film had the following construction:
(skin/PBL_A) (xB) 7A1B1A7B1A1B ... 7A1B1A7B1A1B (skin/PBL_A)

Example 2b, the film had the following construction:
(skin/PBL_A) 7B1A1B7A1B1A ... 7B1A1B7A1B1A (xB) (skin/PBL$_{13}$ A)

In either case, the total number of layers in the effective optical packet is 6n+1, where n is the number of unit cells in the packet without the extra layer. The film construction in Example 2a does not have symmetry regardless of the thickness of the xB layer. The film construction in Example 2b achieves symmetry only when x=7.

Figure 15:
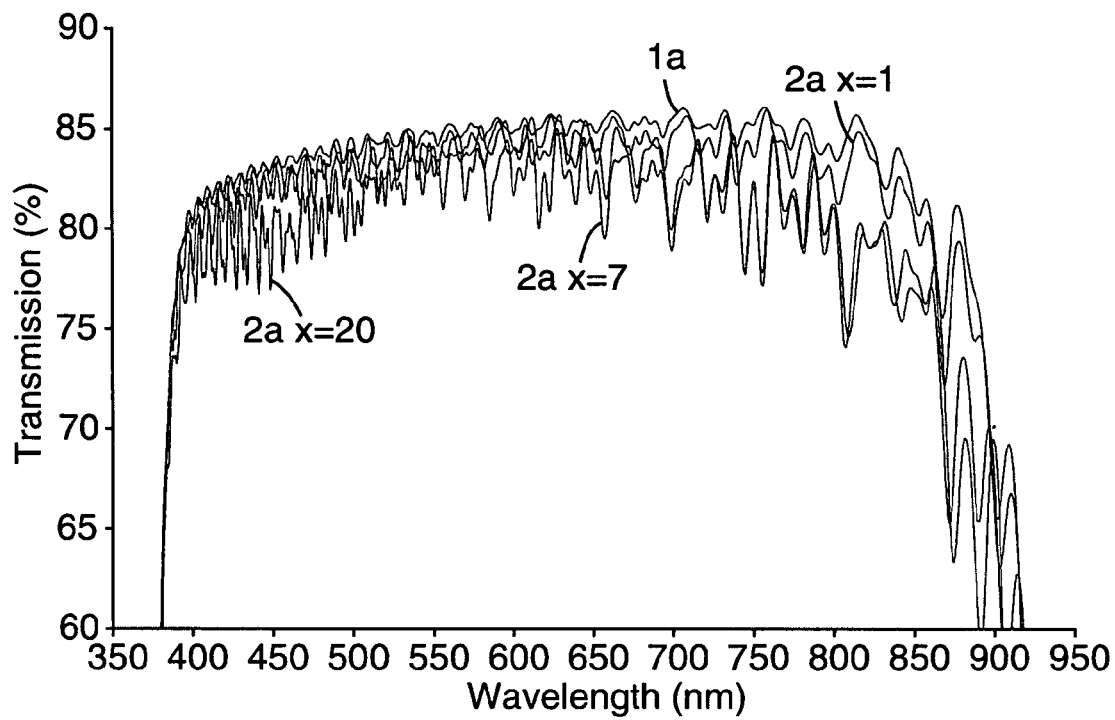
FIG. 15 compares the computed normal incidence transmission spectrum of one of the multilayer IR film embodiments of FIG. 13 with computed spectra for embodiments that differ only by the addition of one optical layer at one end of the optical packet, and by two optical layers at one end of the effective optical packet.

The spectra in FIG. 15 were obtained for three simulated films according to Example 2a with x=1, 7, and 20 respectively, each such film having three optical packets with 32 unit cells in each packet. The film stack was constructed as follows:
skin/PBL (packet 1) PBL (packet 2) PBL (packet 3) skin/PBL.

The high index optical material used in the optical stack, PBLs and skins was low melt point PEN with index of refraction 1.73 (along both in-plane directions), and the low index optical material used in the optical stack was PMMA with index 1.49 (along all directions). A linear thickness gradient of 1.27 was used as in Example 1, as were the 1.11 and 1.22 scaling factors for packets 2 and 3. The physical thicknesses of the non-optical layers were also the same as in Example 1. FIG. 15 shows that the extra layer destroys the pseudo-symmetry resulting in increased noise in the visible spectrum and lower transmission. As the thickness of the extra layer increases, the noise becomes stronger and the visible transmission decreases. However, the changes are wavelength dependent and are not linear.

The calculated values for photometric parameters L*, a*, and b*, and photopic transmission Y for both the simulated IR film itself and the simulated glass laminate of automotive glass 58/15 mil PVB/IR reflecting film/15 mil PVB/glass 58 are listed in Table 2 below.

TABLE 2

| Construction | L* | a* | b* | Y |
|---|---|---|---|---|
| Film Example 1a | 93.75 | −0.03 | 1.08 | 84.69 |
| Film Example 2a (x = 1) | 93.42 | −0.09 | 1.19 | 83.92 |
| Film Example 2a (x = 7) | 92.96 | −0.26 | 0.29 | 82.88 |
| Film Example 2a (x = 20) | 93.10 | 0.18 | 2.49 | 83.21 |
| Laminate Example 1.1 | 90.90 | −6.02 | 1.96 | 78.26 |
| Laminate Example 2a (x = 1) | 90.55 | −6.07 | 2.08 | 77.50 |
| Laminate Example 2a (x = 7) | 90.09 | −6.21 | 1.16 | 76.49 |
| Laminate Example 2a (x = 20) | 90.22 | −5.76 | 3.43 | 76.77 |

Figure 16:
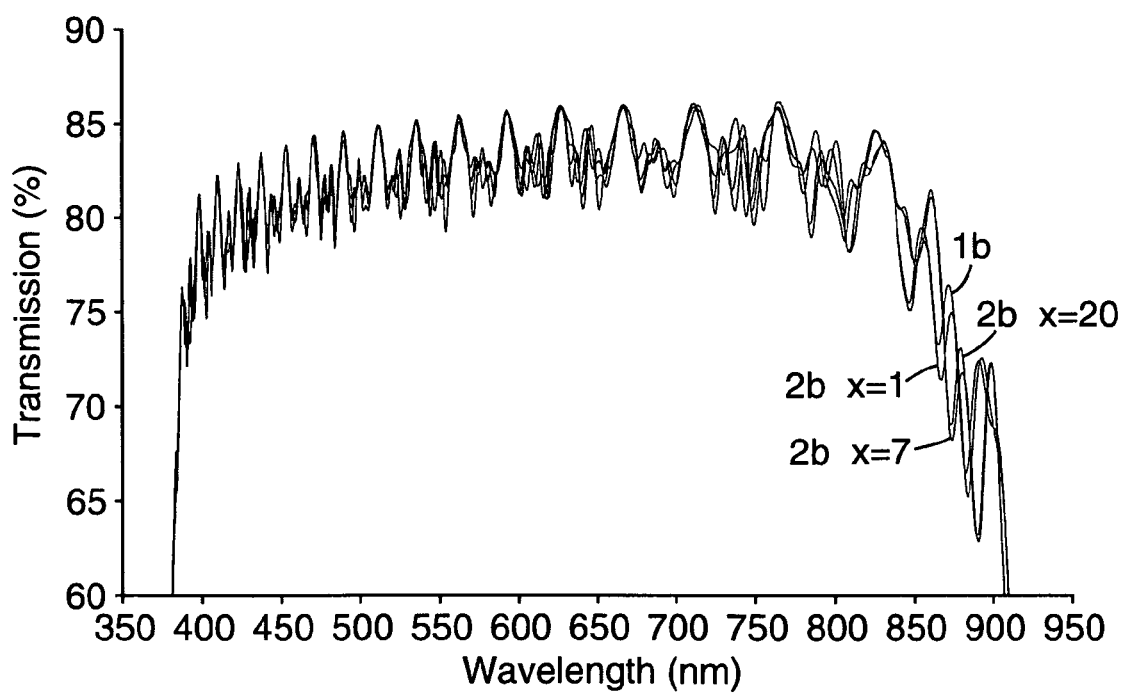
FIG. 16 is a transmission spectrum of a multilayer IR film embodiment with a 711 layer construction.

FIG. 16 shows the spectra for film simulations according to Example 2b with x=1,7, and 20 respectively. Other parameters are the same as in Example 2a. FIG. 16 shows that the extra layer results in increased noise in the visible region of the spectrum in roughly comparable amounts for all three thicknesses of the additional layer. As noted above, the film 2b(x=7) exhibits pseudo-symmetry unlike film 1b, 2b(x=1), and 2b(x=20), yet FIG. 16 shows no decrease in noise for the film 2b(x=7) because, it is believed, characteristics other than symmetry or pseudo-symmetry can also be significant. The calculated values for photometric parameters L*, a*, b*, and photopic transmission Y for both the simulated IR film itself and the simulated glass laminate of automotive glass 58/15 mil PVB/IR reflective film/15 mil PVB/glass 58 are listed in Table 3 below.

TABLE 3

| Construction | L* | a* | b* | Y |
|---|---|---|---|---|
| Film Example 1a | 93.75 | −0.03 | 1.08 | 84.69 |
| Film Example 2b (x = 1) | 92.42 | 0.02 | 1.22 | 82.82 |
| Film Example 2b (x = 7) | 93.03 | −0.05 | 1.37 | 83.04 |

TABLE 3-continued

| Construction | L* | a* | b* | Y |
|---|---|---|---|---|
| Film Example 2b (x = 20) | 92.77 | −0.14 | 1.30 | 82.43 |
| Laminate Example 1.1 | 90.90 | −6.02 | 1.96 | 78.26 |
| Laminate Example 2b (x = 1) | 90.05 | −5.94 | 2.11 | 76.41 |
| Laminate Example 2b (x = 7) | 90.15 | −6.01 | 2.26 | 76.62 |
| Laminate Example 2b (x = 20) | 89.87 | −6.10 | 2.20 | 76.03 |

Example 3

In these simulated constructions, the skin/PBL had an index of refraction different from the index of refraction of either of the materials in the optical stack.

Three cases were considered:

Example 3a: skin/PBL index>the index of the high index optical material

Example 3b: the index of the low index optical material<skin/PBL index<high index of optical material Example 3c: skin/PBL index<the index of the low index optical material The simulated spectra were obtained for each example using a 711 optical stack construction with a layer arrangement of approximately 7A1B1A7B1A1B . . . 7A1B1A7B1A1B in each of the three packets. The film was constructed as: skin/PBL (packet 1) PBL (packet 2) PBL (packet 3) skin/PBL with each packet having 32 unit cells. The high index optical material was low melt point PEN with index of refraction 1.73 (along both in-plane directions), the low index optical material was PMMA with index 1.49 (along all directions). The skin/PBL index used were 1.91, 1.61 and 1.32 for Example 3a, Example 3b and Example 3c respectively. The layer thickness gradient, scaling factor for packets 2 and 3, and non-optical layer physical thicknesses were the same as in Example 1.

Figure 17:
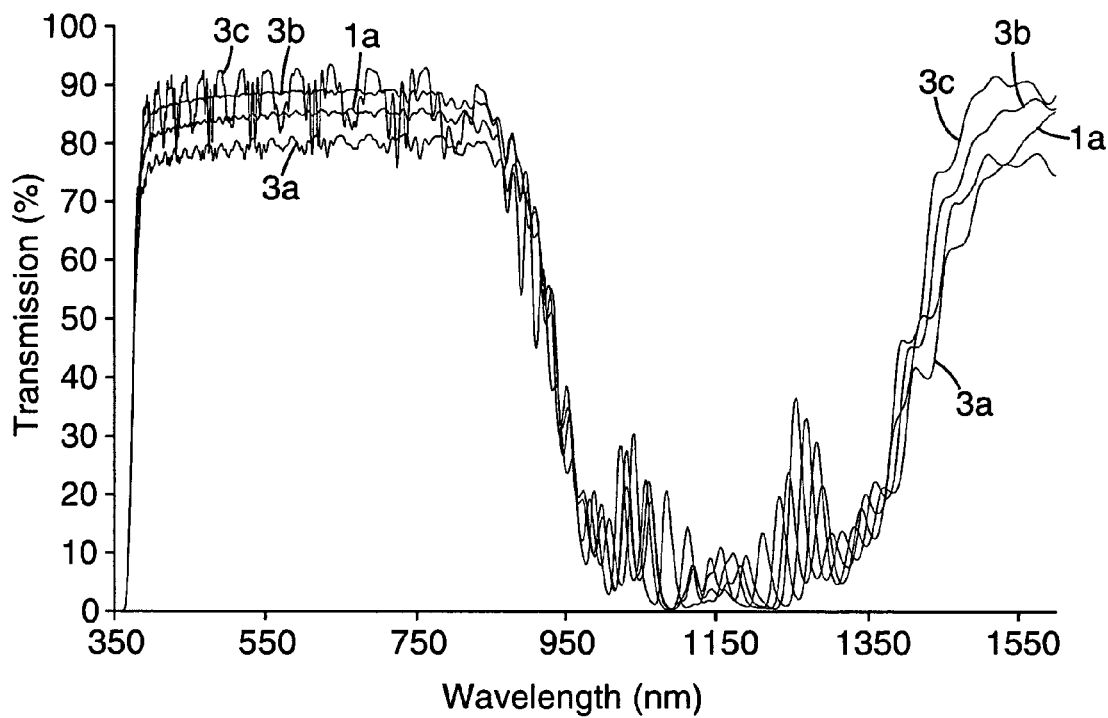
FIG. 17 is a transmission spectrum of a multilayer IR film embodiment with a 711 layer construction.

The simulated normal incidence spectra are shown in FIG. 17, together with the simulated normal incidence spectrum for Film 1a described previously. When the skin/PBL index is different from the index of any of the optical materials, one cannot have a symmetrical layer arrangement with integer number of unit cells. FIG. 17 illustrates that the skin/PBL index can affect the visible transmission spectrum greatly. When PBL/skin index was greater than the index of any of the two materials in the optical stack, the visible transmission level was much lower and had increased noise. When the PBL/skin index was lower than the index of both optical stack materials, the visible transmission level was higher but the noise was much greater. When the PBL/skin index fell in between the index of the two optical materials, the visible transmission was high and quite smooth. The smoothness is similar to the best cases when PBL/skin index is equal to the high index of the optical materials.

Example 4

In this example, several quarter wave constructions were evaluated by simulation.

In Example 4a, the film construction was as follows:
(skin/PBL_A) ABAB . . . AB (skin/PBL_A)

This quarter wave two layer unit cell system with skin/PBL having the same index as optical layer A is symmetrical. Following the merger of the skin/PBL with the outer layer of the optical stack, the effective optical stack has 2n−1 layers, where n is number of unit cells. However, the merger maintains the total number of unit cells a near integer, so the visible spectrum would be expected to have little noise.

In Example 4b, the film construction was as follows:
(skin/PBL_C) ABAB . . . AB (skin/PBL_C)

The index of skin/PBL was different from the index of either of the optical materials, so the optical stack was no longer symmetrical. The visible spectrum would be expected to have more noise than the spectrum of the film of Example 4a.

In Example 4c, the film construction was as follows:
(skin/PBL) (xB) ABAB . . . AB (skin/PBL)

When adding an extra layer xB between skin/PBL and the optical stack (total number of layers in the effective optical stack=2n+1), the stack will be symmetrical only when xB is a ¼ wave thickness, since quarter-wave thicknesses were used for each of the other optical layers A, B. But the total number of unit cells will be integer only when merger occurs as a result of the skin/PBL index being equal to the index of one of the optical materials.

The simulated normal incidence spectra were obtained for a 60 unit cell construction of low melt point PEN (index=1.73)/PMMA (index=1.49) packets. The extra layer was PMMA, and had a thickness x=0 (Example 4a—i.e., no extra layer), 1 (¼ wave, Example 4c), 12 (3 wave, Example 4c) and 36 (9 wave, Example 4c) respectively. The skin/PBLs were made of low melt PEN. A 1.20 linear thickness gradient was used for each of the Examples 4a–c, and the skin/PBL physical thickness was 5792 nm. The results are shown in FIG. 18.

Figure 18:
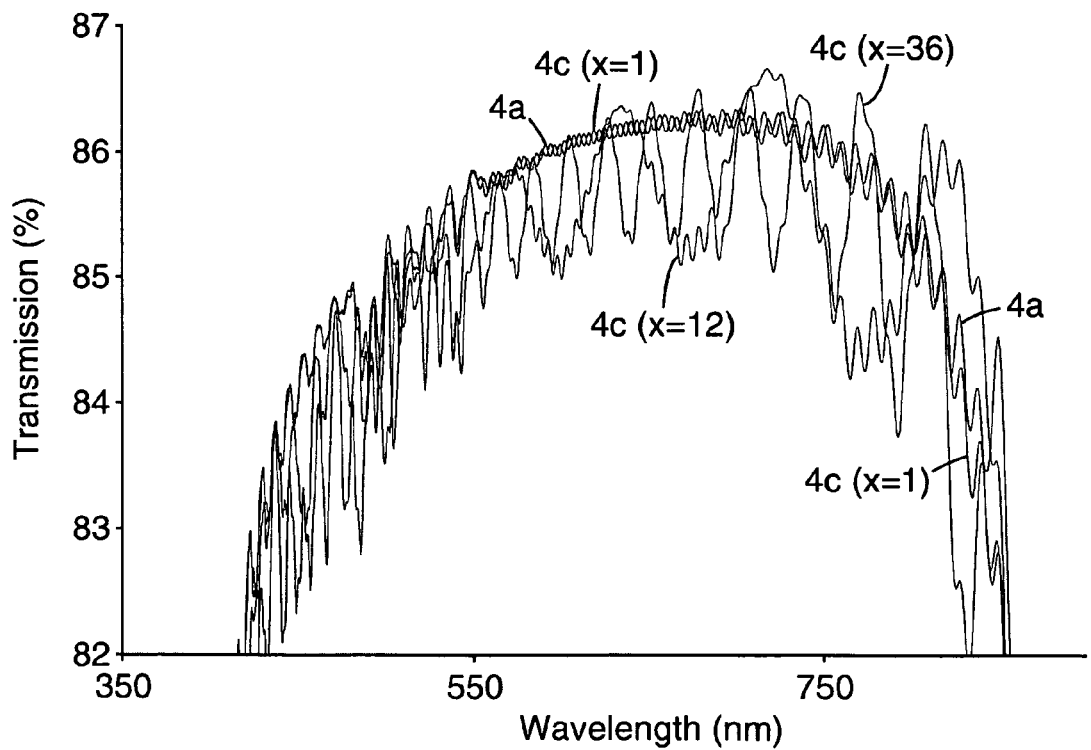
FIG. 18 is a transmission spectrum of a multilayer IR film embodiment with a quarter wave layer construction.

FIG. 18 shows that in the results of Example 4c (x=1) are very similar to those of Example 4a. Both constructions have symmetrical layer stacks with the only difference that the former has one more complete unit cell than the latter. When the thickness of the extra layer xB is greater than ¼ wave thickness, the noise in visible spectra increased. As the thickness of the extra layer increased from 3 to 9 waves, the noise appeared to decrease slightly.

Figure 19:
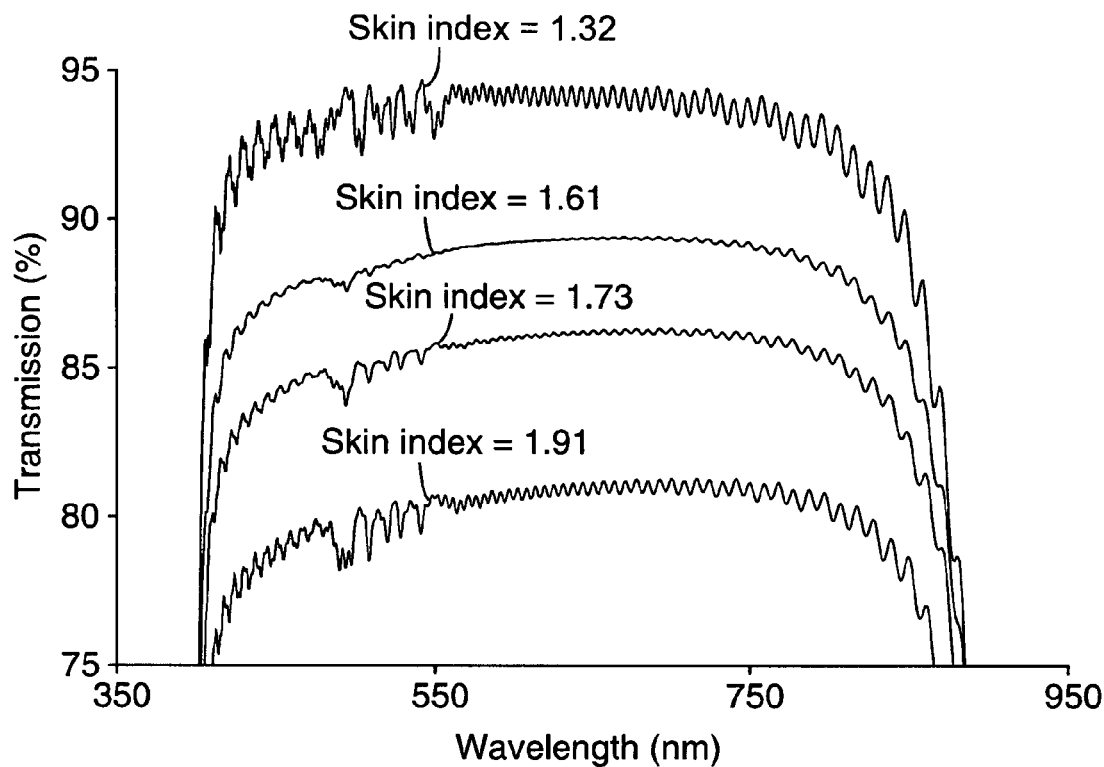
FIG. 19 is a transmission spectrum of a multilayer IR film embodiment with a quarter wave layer construction.

FIG. 19 shows normal incidence spectra obtained for four simulated films each having a single optical packet that has 60 unit cells of low melt point PEN (index=1.73)/PMMA (index=1.49), each film modeled according to Example 4b. The skin/PBL index used was 1.32, 1.61, 1.73, and 1.91 respectively. Similar to the 711 construction investigated above, the transmission level tends to decrease as the PBL/skin index increases. In terms of noise, when PBL/skin index is bounded in between the two optical materials, the noise is small. Beyond that, going either way (higher or lower), the noise becomes greater.

Example 5

Figure 20:
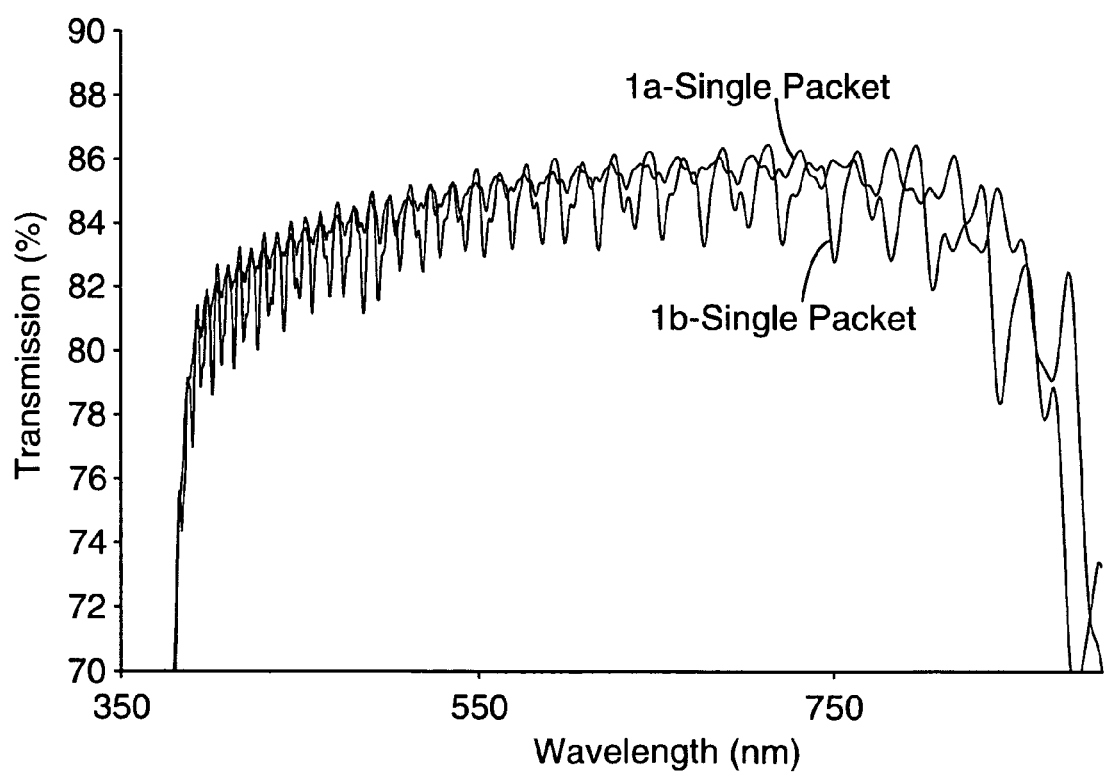
FIG. 20 is a transmission spectrum of a multilayer IR film embodiment with a 711 layer construction and a single optically active packet.

To establish that the noise is not due to multiple packets, simulated spectra were obtained for the constructions in Examples 1a and 1b but with films having only one packet of 31 unit cells of type 711. FIG. 20 confirms that such a single-packet film according to Example 1b (asymmetrical) has much greater noise than a single-packet film according to Example 1a (symmetrical).

Example 6

Figure 21:
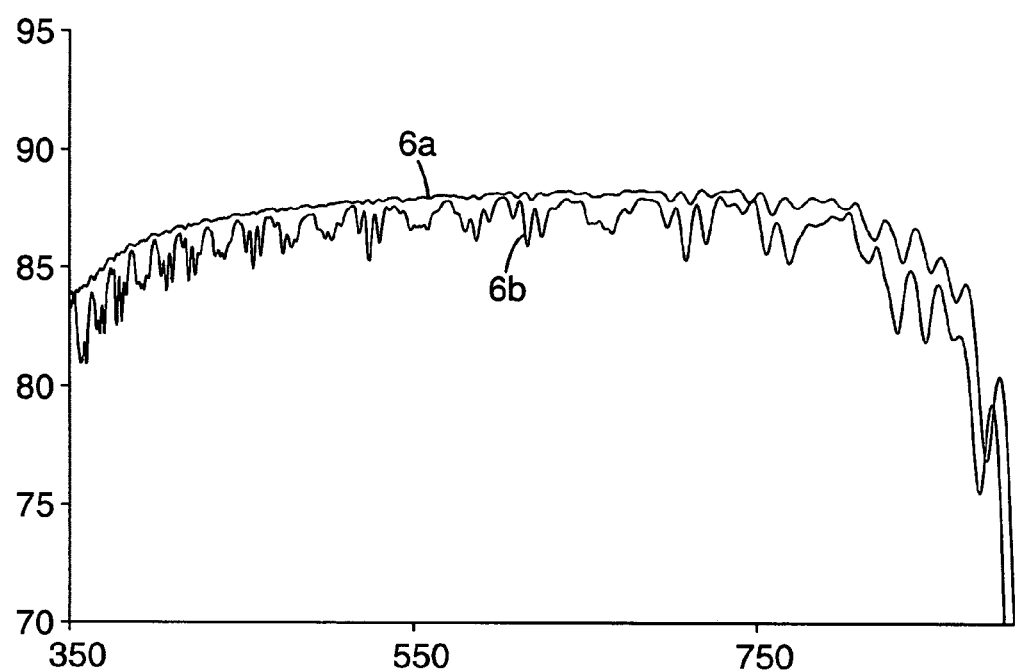
FIG. 21 is a transmission spectrum of a multilayer IR film embodiment with a 711 layer construction.

Films identical to those of Example 1 were modeled and evaluated, except that the polymers PET/coPMMA were used in the optical stack in place of the low melt point PEN/PMMA system of Example 1. The films are referred to as Example 6a (corresponding to the construction of Example 1a) and Example 6b (corresponding to the construction of Example 1b). The in-plane indices of PET and coPMMA are 1.65 and 1.49 respectively. The calculated normal incidence transmission spectra are shown in FIG. 21. The greater amount of observed noise in the Film 6*b* (asymmetrical) compared to the Film 6*a* (symmetrical) confirms that the same criteria for visible noise reduction apply for the different polymers chosen.

Example 7

Figure 22:
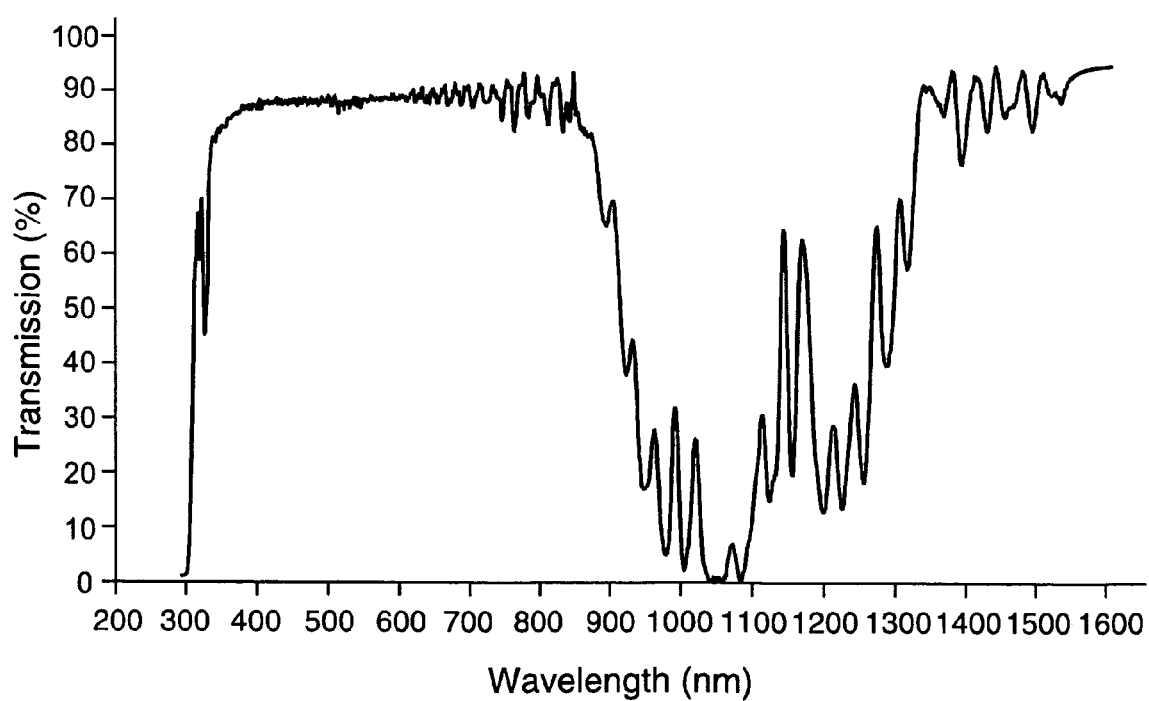
FIG. 22 is a transmission spectrum of a multilayer IR film embodiment with a 711 layer construction.

An IR reflecting multilayer film construction was designed using the symmetrical 711 layer structure described in Example 1a above, except that packet 1 was disposed between packets 2 and 3. The film was actually fabricated using extrusion melt processing with a multilayer feedblock. PET/coPMMA polymers were used in the optical stack, and the spectrum in FIG. 22 was actually measured on the resulting film using a Lambda 19 spectrometer. This construction had clean/smooth and high visible transmission.

Matrix of Further Examples

Figure 23:
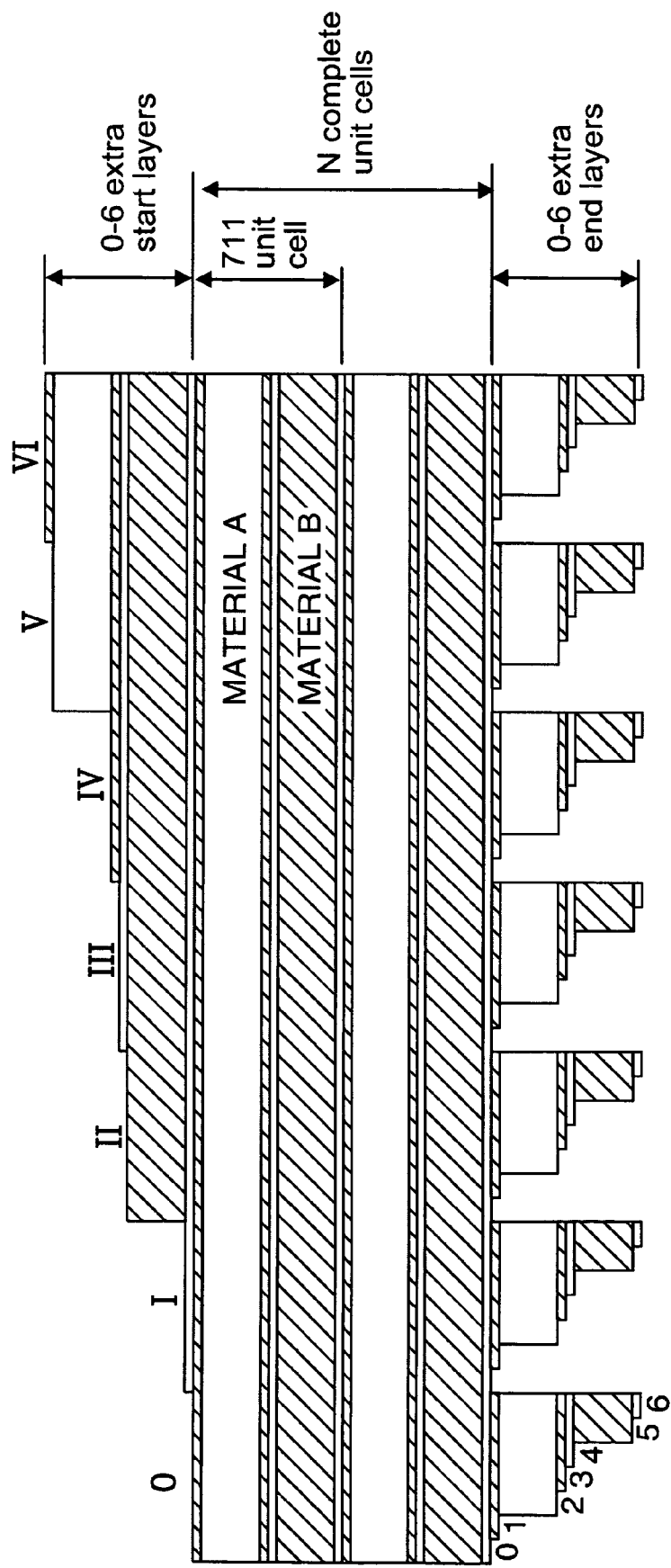
FIG. 23 is a representation of forty-nine different layer configurations for an optical packet having a 711 layer construction.

For optical packets made from a plurality of unit cells having the six layer 7-1-1-7-1-1 construction, there are six possible starting layer permutations, i.e., when counting unit cells beginning at one end of the optical packet (7A-1B-1A-7B-1A-1B, 1B-1A-7B-1A-1B-7A, and 1A-7B-1A-1B-7A-1B are three such cyclic permutations). If the optical packet includes fractional unit cells at the other end thereof, then many permutations of the optical packet are possible, as shown in the optical packet representation of FIG. 23. There, alternating A and B optical layers in the 7-1-1 construction are shown, where a core of N complete unit cells arranged from top to bottom as 1B-7A-1B-1A-7B-1A are always present and zero to six optical layers (following the same sequence) can be added on top and bottom. For simplicity, PBL/skin layers are not shown. Added top layers are identified by Roman numerals and added bottom layers are identified by Arabic numerals. FIG. 23 therefore depicts in a graphical manner 49 optical packet arrangements, each such arrangement corresponding to a different vertical slice of the figure and each such arrangement identifiable by a two-part Roman numeral, Arabic numeral designation. For instance, the designation IV2 is an arrangement where four extra layers are provided on top of the core packet and two extra layers are provided on the bottom.

The number of permutations is further multiplied when one adds non-optical layers on both sides of the optical packet and permits such non-optical layers to take on various refractive indices. The layer arrangement is thus:

(skin/PBL)/optical packet/(skin/PBL), where the optical packet is one of the 49 permutations depicted in FIG. 23. For computational purposes, we selected:

N=30 (i.e., the number of complete 711 unit cells in the core)

$n_A$=1.65

$n_B$=1.50

$n_{skin/PBL}$=variable: 1.0 (i.e., air, with no skin or PBL layer); 1.425; 1.5; 1.5375; 1.575; 1.6125; 1.65; 1.725 unit cell optical thickness=0.5·850 nm (uniform throughout the stack–no gradient)

skin/PBL layer thickness=2348.04 nm (physical thickness, not optical thickness)

All refractive indices are along at least one common in-plane direction (x, y, or both), and are assumed to be constant throughout the visible and the near infrared (about 400 to about 2000 nm). The optical body was modeled as being immersed in air (index=1). The normal incidence spectrum was calculated and evaluated for each of the 392 cases (49 optical packets from the matrix and 8 different skin/PBL non-optical layer conditions). Note that for the cases where $n_{skin/PBL}$=1.0, 1.425, 1.5375, 1.575, 1.6125, and 1.725, no merging of optical and non-optical layers occurs and thus the effective optical packet is the same as the original optical packet. But that is not necessarily so for $n_{skin/PBL}$=1.5 and 1.65, where one, both, or neither of the outermost optical layers merges with one of the skin/PBL layers depending on the optical layer permutation from among the 49 shown in FIG. 23.

FIG. 24a provides a matrix showing, for each of the 49 optical packets of FIG. 23, the symmetry properties and deviation from an integer number of unit cells of the effective optical packet that results when $n_{skin/PBL}$=1.0, 1.425, 1.5375, 1.575, 1.6125, and 1.725, and in general when the optical packet is bordered by non-optical layers of different refractive index than any optical layer in the packet. For example, case 03 has a symmetric effective optical packet (indicated by "SYM" in the upper portion of the box) that deviates from an integer number of unit cells by 3 optical layers (indicated by +3 in the lower portion of the box). Similarly, the effective optical packet of case III3 has reverse symmetry (indicated by "RVS" in the upper portion of the box) and has an integer number of unit cells (indicated by "+0" in the lower portion of the box). The effective optical packet of case II3 is asymmetric (indicated by no label in the upper portion of the box) and is one optical layer short of an integer number of unit cells (indicated by "−1" in the lower portion of the box).

FIG. 24b is similar to FIG. 24a except that FIG. 24b shows the symmetry properties and deviation from an integer number of unit cells of the effective optical packet that results when $n_{skin/PBL}$=1.5, and in general when the optical packet is bordered by non-optical layers having a refractive index substantially equal to the low index optical layers in the packet. FIG. 24c is likewise similar to FIGS. 24a–b except that FIG. 24c shows the symmetry properties and deviation from an integer number of unit cells of the effective optical packet that results when $n_{skin/PBL}$=1.65, and in general when the optical packet is bordered by non-optical layers having a refractive index substantially equal to the high index optical layers in the packet.

FIGS. 25a–h show the results of the computer simulation for each of the 49 permutations of the optical stack with the following non-optical layer refractive index:

FIG. 25a—$n_{skin/PBL}$=1.0 (no skin or PBL layer)

FIG. 25b—$n_{skin/PBL}$=1.425

FIG. 25c—$n_{skin/PBL}$=1.5

FIG. 25d—$n_{skin/PBL}$=1.5375

FIG. 25e—$n_{skin/PBL}$=1.575

FIG. 25f—$n_{skin/PBL}$=1.6125

FIG. 25g—$n_{skin/PBL}$=1.65

FIG. 25h—$n_{skin/PBL}$=1.725

The numbers listed in FIGS. 25a–h are the range from maximum calculated percent transmission to minimum calculated percent transmission in a spectral range beginning at 400 nanometers and ending at 600 nanometers, i.e., a portion of the visible spectral region. The values listed are in percentages, for example, a percent transmission that ranges from 85% to 90% over the cited spectral region yields a value of "5" in the table. The range of percent transmission was the figure of merit chosen to represent the amount of spectral noise in the visible region. Thus, an embodiment that has a relatively large variation in percent transmission over the 400–600 nm range will have a large value, and an embodiment that has a relatively small amount of variation (i.e. a smooth transmission spectrum in the visible region) will have a relatively small value.

Inspection of FIGS. 25a–h reaffirms that the beginning and ending optical layers of the effective optical packet, and the particular cyclic permutation of the basic unit cell structure, can have a significant impact on spectral noise in the visible region. The lowest amount of visible noise occurs when the non-optical layers bordering the packet have an index about half-way between the high and low index optical layers. Under that condition, the lowest noise occurs for layer arrangements that exhibit reverse symmetry in the effective optical packet, regardless of the number of layers away from an integer number of unit cells. Another special condition occurs where the non-optical layers have the same refractive index as either the low or high index optical layer. In those cases, the lowest visible noise occurs for layer arrangements in which the effective optical stack exhibits symmetry and is one optical layer short of an integer number of unit cells.

Applicants note that the numerical simulations referred to herein used accepted matrix multiplication techniques to calculate the transmission spectrum of a given multilayer stack. Accepted numerical smoothing techniques were also used to avoid anomalous sampling effects and more accurately represent spectra as they would be measured, for example, on a conventional spectrometer. One numerical smoothing technique was used consistently for the data represented by FIGS. 13–21, and a second numerical smoothing technique was used consistently for the data represented by FIGS. 25a–h.

All U.S. patents, U.S. patent publications, U.S. patent applications, and PCT publications referred to above are incorporated herein by reference. A number of embodiments of the invention have been described. Nevertheless, it will be understood that various modifications may be made without departing from the spirit and scope of the invention. For example, the principles taught herein can be used to obtain films having a high rather than low amount of noise in the visible region if desired, for example in a decorative or ornamental application where iridescence is beneficial. Similarly, figures of merit that combine the spectral variability in the visible region with the average transmission level in the visible region, and/or with average reflectivity or transmission level over an infrared wavelength range, and/or with other optical characteristics, can also be used. Further, comparisons for purposes of achieving a better optical figure of merit can be done on simulated or fabricated optical bodies that can include not only one or more effective optical packets but also more conventional elements such as glazing layers, PVB layers, etc. The inclusion of such additional elements may affect the outcome of such comparisons. Accordingly, other embodiments are within the scope of the following claims.

What is claimed is:

1. A multilayer film article comprising:
an infrared light reflecting multilayer film having alternating layers of a first polymer type and a second polymer type bounded by one or more non-optical layers; and
an infrared light absorbing or reflecting layer disposed on at least one of the non-optical layers of the multilayer film;
wherein the infrared light reflecting multilayer film is adapted to reflect at least 50% of light in a band at least 100 nm wide positioned between wavelengths from about 700 nm to about 2000 nm.

2. A multilayer film article according to claim 1 wherein the infrared light absorbing or reflecting layer comprises an infrared light absorbing pigment or dye.

3. A multilayer film article according to claim 1 wherein the infrared light absorbing or reflecting layer comprises a metal.

4. A multilayer film article according to claim 1 wherein the infrared light absorbing or reflecting layer comprises silver.

5. A multilayer film article according to claim 1 wherein the infrared light absorbing or reflecting layer comprises a metal layer and an infrared light absorbing pigment or dye.

6. A multilayer film article according to claim 1 wherein the first polymer type comprises polyethylene terephthalate and the second polymer type comprises poly(methyl methacrylate) or a copolymer of poly(methyl methacrylate).

7. An optical body comprising at least a first effective optical packet of contiguous optical layers bounded by optically thick layers, the optical layers composed of alternating diverse materials A,B and an infrared light absorbing or reflecting layer is disposed on at least one of the optically thick layers;
wherein the optical layers when counted from one end of the first effective optical packet form a plurality of unit cells each having six optical layers arranged in relative optical thicknesses in a first cyclic permutation of 7A1B1A7B1A1B; and
wherein at normal incidence the first effective optical packet provides a reflection band at infrared wavelengths and substantially transmits light at visible wavelengths.

8. An optical body according to claim 7 wherein the materials A,B have refractive indices that satisfy a relationship $n_A > n_B$ along at least one in-plane axis, where $n_A$ is a reflective index of material A and $n_B$ is a reflective index of material B.

9. An optical body according to claim 7 wherein the optical body exhibits a variability in transmission over a visible wavelength range and a first optical layer disposed at the one end of the first effective optical packet and a second optical layer disposed at an opposite end of the first effective optical packet are selected from among the sequence of six optical layers 7A1B1A7B1A1B to reduce the variability in transmission.

10. An optical body according to claim 7 wherein the infrared light absorbing or reflecting layer comprises an infrared light absorbing pigment or dye.

11. An optical body according to claim 7 wherein the infrared light absorbing or reflecting layer comprises a metal.

12. An optical body according to claim 7 wherein the infrared light absorbing or reflecting layer comprises silver.

13. An optical body according to claim 7 wherein the material A comprises polyethylene terephthalate and the material B comprises poly(methyl methacrylate) or a copolymer of poly(methyl methacrylate).

14. An optical body according to claim 7 wherein the optical body further comprises a first layer of glazing material.

15. An optical body according to claim 7 wherein the optical body reflects at least 50% of light in a band at least 100 nm wide positioned between wavelengths from about 700 nm to about 2000 nm.

* * * * *